United States Patent
Chiu

(10) Patent No.: US 11,023,374 B2
(45) Date of Patent: Jun. 1, 2021

(54) APPARATUS AND METHOD AND COMPUTER PROGRAM PRODUCT FOR CONTROLLING DATA ACCESS

(71) Applicant: SILICON MOTION, INC., Zhubei (TW)

(72) Inventor: Shen-Ting Chiu, Miaoli County (TW)

(73) Assignee: SILICON MOTION, INC., Hsinchu (TW)

(*) Notice: Subject to any disclaimer, the term of this patent is extended or adjusted under 35 U.S.C. 154(b) by 283 days.

(21) Appl. No.: 16/263,117

(22) Filed: Jan. 31, 2019

(65) Prior Publication Data

US 2020/0012599 A1 Jan. 9, 2020

Related U.S. Application Data

(63) Continuation-in-part of application No. 16/250,326, filed on Jan. 17, 2019.

(30) Foreign Application Priority Data

Jul. 9, 2018 (CN) .......................... 201810746676.3
Oct. 15, 2018 (CN) .......................... 201811194779.X

(51) Int. Cl.
*G06F 12/06* (2006.01)
*G06F 12/02* (2006.01)
(Continued)

(52) U.S. Cl.
CPC ...... *G06F 12/0607* (2013.01); *G06F 12/0246* (2013.01); *G06F 12/1009* (2013.01);
(Continued)

(58) Field of Classification Search
CPC ............. G06F 12/0246; G06F 12/1009; G06F 11/3034; G06F 12/0646; G06F 12/0607; G11C 16/08; G11B 27/329
See application file for complete search history.

(56) References Cited

U.S. PATENT DOCUMENTS

| 5,924,098 A | 7/1999 | Kluge |
| 6,067,547 A | 5/2000 | Douceur |

(Continued)

FOREIGN PATENT DOCUMENTS

| CN | 1145881 C | 4/2004 |
| TW | 201617885 A | 5/2016 |
| TW | 201741883 A | 12/2017 |

OTHER PUBLICATIONS

Taiwanese Search Report, dated Sep. 6, 2019, for Taiwanese Application No. 107136225.

(Continued)

*Primary Examiner* — Etienne P Leroux
(74) *Attorney, Agent, or Firm* — Birch, Stewart, Kolasch & Birch, LLP

(57) ABSTRACT

The invention introduces an apparatus for controlling data access that includes a memory, an access interface and a processing unit. The processing unit is arranged to operably receive logical-to-physical (L2P) mapping information corresponding to a programming operation through the access interface and store the L2P mapping information in the memory; searching the L2P mapping information to obtain a first logical address associated with user data stored in space of each physical address and a second logical address associated with user data stored in space of each next physical address; generating content of a plurality of entries of a link-based L2P mapping sub-table in the order of logical addresses, wherein each entry of the link-based L2P mapping sub-table stores information about a physical address and a second logical address associated with a corresponding first logical address; and store the link-based L2P mapping sub-table.

20 Claims, 14 Drawing Sheets

(51) Int. Cl.
  *G06F 16/901* (2019.01)
  *G06F 12/1009* (2016.01)
  *G06F 12/12* (2016.01)

(52) U.S. Cl.
  CPC .......... *G06F 12/12* (2013.01); *G06F 16/9024* (2019.01); *G06F 2212/7201* (2013.01); *G06F 2212/7205* (2013.01)

(56) References Cited

U.S. PATENT DOCUMENTS

| | | | |
|---|---|---|---|
| 9,043,675 B2 | 5/2015 | Kato et al. | |
| 9,942,169 B1 | 4/2018 | Detwiler | |
| 2003/0101327 A1* | 5/2003 | Beck | G06F 12/1009 711/206 |
| 2004/0109376 A1* | 6/2004 | Lin | G11C 16/08 365/230.03 |
| 2005/0066111 A1* | 3/2005 | Mantani | G11B 27/329 711/103 |
| 2010/0191897 A1 | 7/2010 | Zhang et al. | |
| 2011/0087829 A1* | 4/2011 | Lin | G06F 12/0646 711/103 |
| 2014/0129760 A1* | 5/2014 | Lee | G06F 12/0246 711/103 |
| 2014/0129761 A1* | 5/2014 | Kwon | G06F 12/0246 711/103 |
| 2015/0261444 A1 | 9/2015 | Yoshii et al. | |
| 2016/0140048 A1 | 5/2016 | Mukherjee et al. | |
| 2017/0286313 A1 | 10/2017 | Jiang et al. | |
| 2019/0057041 A1* | 2/2019 | Ha | G06F 11/3034 |

OTHER PUBLICATIONS

English translation of the Taiwanese Search Report for Taiwanese Application No. 107123751, dated Feb. 4, 2019.

* cited by examiner

| | 131-0a | | | 131-0b | |
|---|---|---|---|---|---|
| S+0 | (A,0) | | S+0 | (A,0) | |
| S+4 | (A,2) | | S+4 | 15 | |
| S+8 | (A,4) | | S+8 | (A,2) | |
| S+12 | (A,8) | | S+12 | 14 | |
| S+16 | (A,10) | | S+16 | (A,4) | |
| S+20 | (A,12) | | S+20 | 13 | |
| S+24 | (A,14) | | S+24 | (A,8) | |
| S+28 | NULL | | S+28 | 11 | |
| S+32 | (A,15) | | S+32 | (A,10) | |
| S+36 | (A,13) | | S+36 | 10 | |
| S+40 | (A,11) | | S+40 | (A,12) | |
| S+44 | (A,9) | | S+44 | 9 | |
| S+48 | (A,7) | | S+48 | (A,14) | |
| S+52 | (A,5) | | S+52 | 8 | |
| S+56 | (A,3) | | S+56 | NULL | |
| S+60 | (A,1) | | S+60 | NULL | |
| S+64 | 15 | | S+64 | (A,15) | |
| S+68 | 14 | | S+68 | NULL | |
| S+72 | 13 | | S+72 | (A,13) | |
| S+76 | 11 | | S+76 | 6 | |
| S+80 | 10 | | S+80 | (A,11) | |
| S+84 | 9 | | S+84 | 5 | |
| S+88 | 8 | | S+88 | (A,9) | |
| S+92 | NULL | | S+92 | 4 | |
| S+96 | NULL | | S+96 | (A,7) | |
| S+100 | 6 | | S+100 | 3 | |
| S+104 | 5 | | S+104 | (A,5) | |
| S+108 | 4 | | S+108 | 12 | |
| S+112 | 3 | | S+112 | (A,3) | |
| S+116 | 12 | | S+116 | 2 | |
| S+120 | 2 | | S+120 | (A,1) | |
| S+124 | 1 | | S+124 | 1 | |

FIG. 5

APPARATUS AND METHOD AND COMPUTER PROGRAM PRODUCT FOR CONTROLLING DATA ACCESS

CROSS-REFERENCE TO RELATED APPLICATIONS

This application is a Continuation-In-Part of and claims the benefit of priority to U.S. patent application Ser. No. 16/250,326, filed on Jan. 17, 2019, which claims the benefit of priority to Patent Application No. 201810746676.3, filed in China on Jul. 9, 2018; and this application also claims the benefit of priority to Patent Application No. 201811194779.X, filed in China on Oct. 15, 2018; the entirety of which is incorporated herein by reference for all purposes.

BACKGROUND

The disclosure generally relates to flash memory and, more particularly, to apparatus and method and computer program product for controlling data access.

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. Actually, NAND flash devices usually read or program several pages of data from or into memory cells. In reality, the NAND flash device always reads from the memory cells and writes to the memory cells complete pages. After a page of data is read from the array into a buffer inside the device, the host can access the data bytes or words one by one by serially clocking them out using a strobe signal.

To improve data-write efficiency, the host may provide continuous data longer than a predefined length, such as 128K bytes, such that the NAND flash memory device can program the data into several storage sub-units thereof in parallel. The NAND flash memory device typically maintains two sorts of mapping tables: Host-to-Flash (H2F); and Flash-to-Host (F2H). The H2F table stores information indicating which location in the NAND flash memory unit user data of each host page is physically stored in. The F2H table stores information indicating which host page assigned by the host user data of each physical block is associated with. The NAND flash memory device typically consumes excessive time to search tables before data accesses to the NAND flash memory units. Thus, it is desirable to have an apparatus, a method and a computer program product for improving data access of the flash memory device by compacting the mapping tables and reducing search time to the compacted mapping tables.

SUMMARY

In an aspect of the invention, an apparatus for controlling data access is introduced to at least include: a memory; an access interface; and a processing unit. The processing unit is arranged to operably receive logical-to-physical (L2P) mapping information corresponding to a programming operation through the access interface and store the L2P mapping information in the memory; searching the L2P mapping information to obtain a first logical address associated with user data stored in space of each physical address and a second logical address associated with user data stored in space of each next physical address; generating content of a plurality of entries of a link-based L2P mapping sub-table in the order of logical addresses; and store the link-based L2P mapping sub-table.

In another aspect of the invention, a method for controlling data access is introduced to at least include: receiving L2P mapping information corresponding to a programming operation through an access interface, and storing the L2P mapping information in the memory; searching the L2P mapping information to obtain a first logical address associated with user data stored in space of each physical address, and a second logical address associated with user data stored in space of each next physical address; generating content of a plurality of entries of a link-based L2P mapping sub-table in the order of logical addresses; and storing the link-based L2P mapping sub-table.

In still another aspect of the invention, a computer program conduct for controlling data access when executed by a process unit, which at least include program code to: receive L2P mapping information corresponding to a programming operation through an access interface, and store the L2P mapping information in the memory; search the L2P mapping information to obtain a first logical address associated with user data stored in space of each physical address, and a second logical address associated with user data stored in space of each next physical address; generate content of a plurality of entries of a link-based L2P mapping sub-table in the order of logical addresses; and storing the link-based L2P mapping sub-table.

The L2P mapping information describes information indicating which physical address of the storage unit user data of each logical address is physically stored in. Each entry of the link-based L2P mapping sub-table stores information about a physical address and a second logical address associated with a corresponding first logical address.

Both the foregoing general description and the following detailed description are examples and explanatory only, and are not restrictive of the invention as claimed.

BRIEF DESCRIPTION OF THE DRAWINGS

FIG. 5 is a schematic diagram illustrating link-based L2P mapping sub-tables stored in a memory according to an embodiment of the invention.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
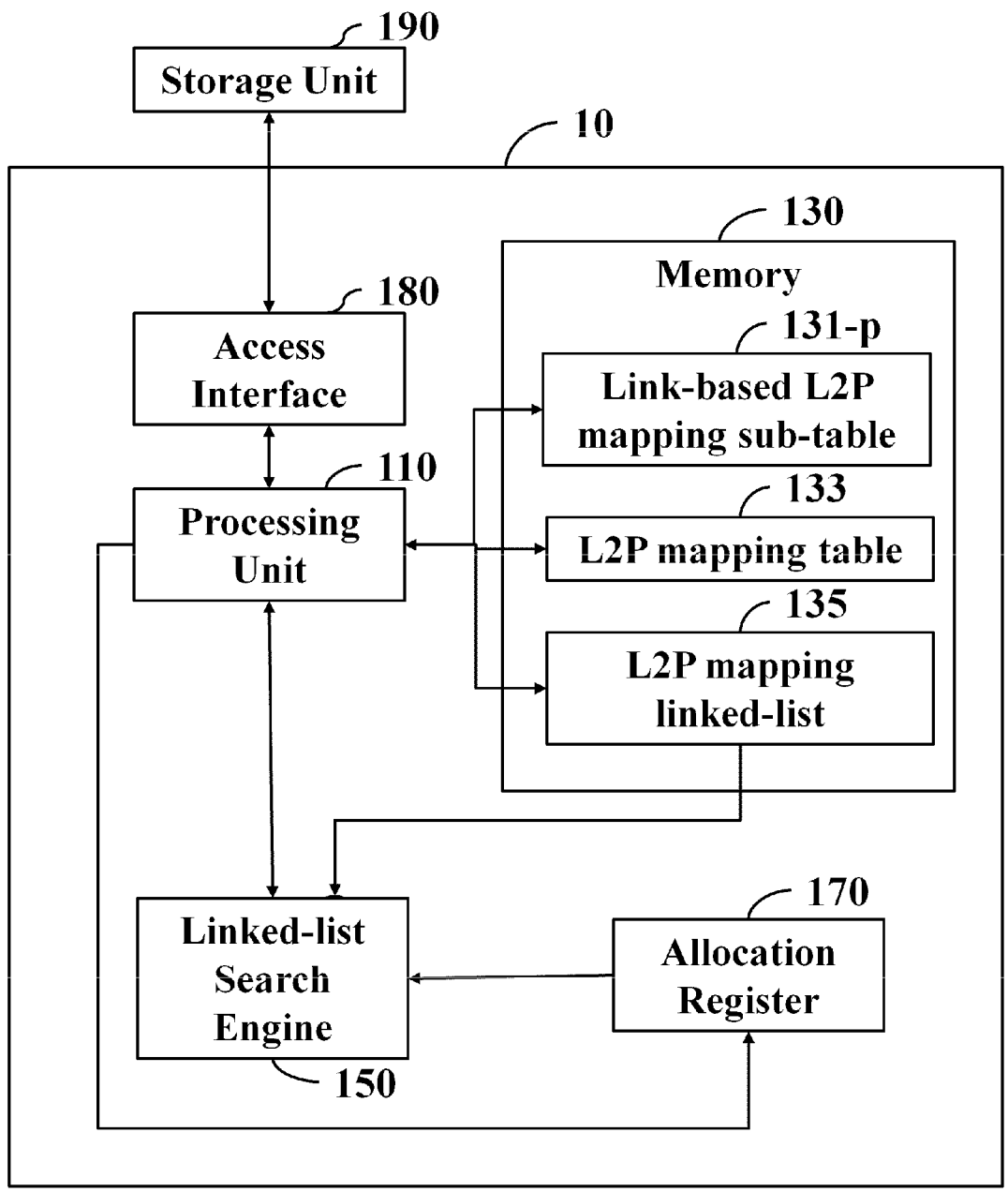
FIG. 1 is a block diagram of an apparatus for controlling data access according to an embodiment of the invention.

Refer to FIG. 1. An apparatus 10 for controlling data access may include a processing unit 110, a memory 130 and a linked-list search engine 150. The apparatus 10 may be practiced in a controller of a NAND flash device or others for accessing data more efficiently. The processing unit 110 may be implemented in numerous ways, such as with general-purpose hardware (e.g., a single processor, multiple processors or graphics processing units capable of parallel computations, a lightweight general-purpose processor, or others) that is programmed using firmware or software instructions to perform the functions of logical-physical location conversions. The memory 130 may be a Dynamic Random Access Memory (DRAM), Static Rand©m Access Memory (SRAM) or a volatile memory of another type. It is understood that the following actions and operations are performed when the processing unit 110 loads and executes relevant firmware or software instruction and simply referred to as that performed by the processing unit 110 for brevity.

The apparatus 10 may further include an access interface 180 to thereby enable the processing unit 110 to communication with the storage unit 190, specifically, using a Double Data Rate (DDR) protocol, such as Open NAND Flash Interface (ONFI), DDR toggle, or others. The processing unit 110 writes user data and mapping tables into a designated address (a destination address) of the storage unit 190 and reads user data and mapping tables from a designated address (a source address) thereof through the access interface 180. The access interface 180 may use several electronic signals including a data line, a clock signal line and control signal lines for coordinating command and data transfer between the processing unit 110 and the storage unit 190. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
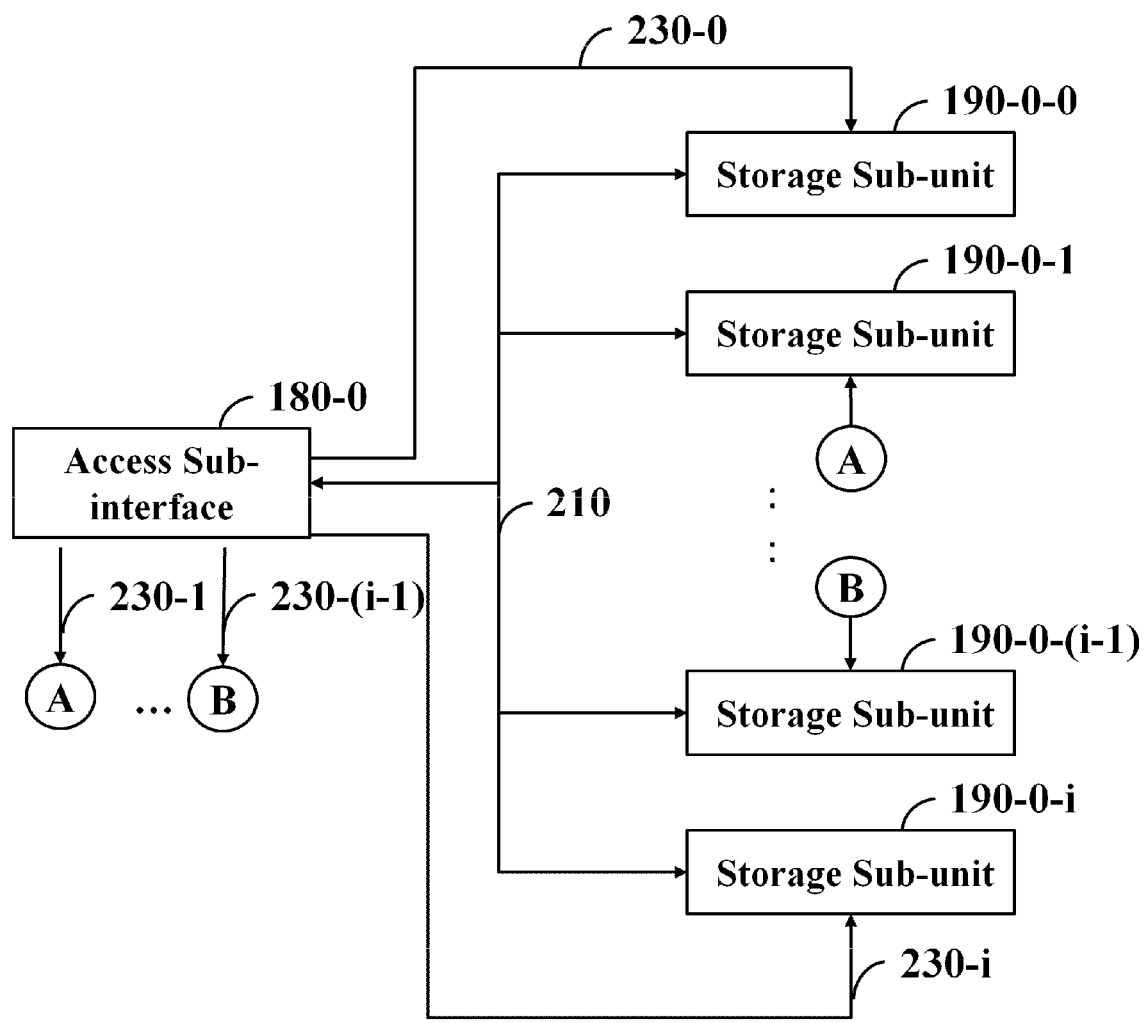
FIG. 2 is a schematic diagram depicting connections between one access sub-interface and multiple storage sub-units according to an embodiment of the invention.

The storage unit 190 may contain multiple storage sub-units and each storage sub-unit may use a respective access sub-interface to communicate with the processing unit 110. One or more storage sub-units may be packaged in a single die. The access interface 180 may contain j access sub-interfaces and each access sub-interface may connect to i storage sub-units. Each access sub-interface and the connected storage sub-units behind may be referred to as a I/O channel collectively and identified by a Logical Unit Number (LUN). That is, i storage sub-units may share the same access sub-interface. For example, assume that the apparatus 10 contains 4 I/O channels and each I/O channel connects to 4 storage sub-units: The apparatus 10 may access 16 storage sub-units. The processing unit 110 may drive one of the access sub-interfaces to read data from the designated storage sub-unit. Each storage sub-unit has an independent CE control signal. That is, it is required to enable a corresponding CE control signal when attempting to perform data read or programming from or into a designated storage sub-unit via an associated access sub-interface. It is apparent that any number of I/O channels may be provided in the apparatus 10, and each I/O channel may include any number of storage sub-units, and the invention should not be limited thereto. Refer to FIG. 2. The processing unit 110, through the access sub-interface 180-0, may use independent GE control signals 230-0-0 to 230-0-$i$ to select one of the connected storage sub-units 190-0-0 to 190-0-$i$, and then read data from or program data into the designated location of the selected storage sub-unit via the shared data line 210.

Figure 3:
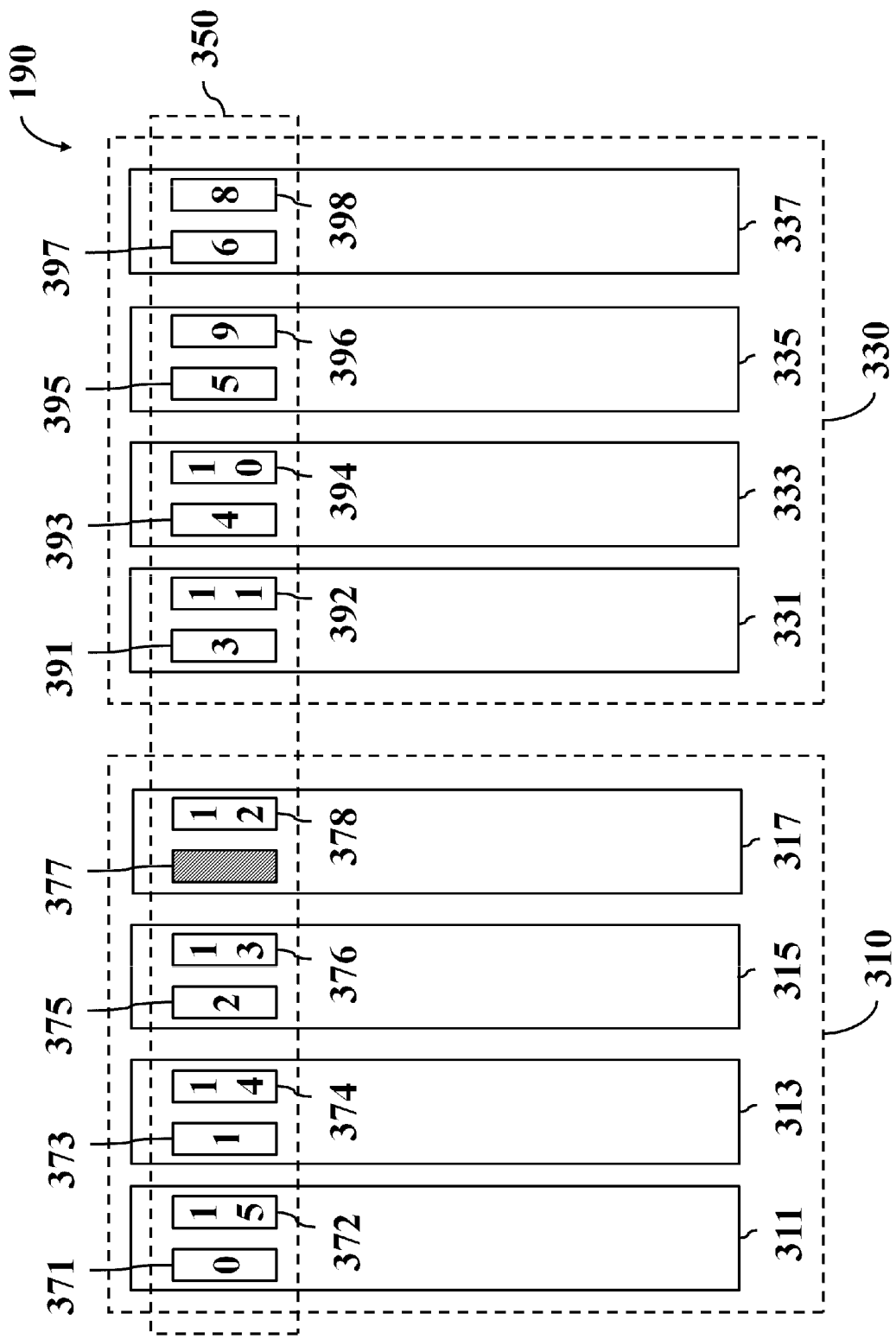
FIG. 3 is a schematic diagram for storing user data according to an embodiment of the invention.

Refer to FIG. 3. Storage sub-units 311, 313, 315 and 317 sharing one access sub-interface form a channel 310 and storage sub-units 331, 333, 335 and 337 sharing the other access sub-interface form a channel 330. The storage sub-unit 311 stores data of two physical pages 371 and 372, the storage sub-unit 313 stores data of two physical pages 373 and 374, and so on. Each physical page may store data of one host page length, such as $2^n$ bytes, n is an integer being equal to or greater than 3. Data stored in each physical page may be represented by a host page number. For example, the physical page 371 stores data of the $0^{th}$ host page, the physical page 372 stores data of the $15^{th}$ host page, the physical page 373 stores data of the $1^{st}$ host page, and so on. Those artisans may use a Logical Block Address LBA or others to identify data stored in each physical page instead, and the invention should not be limited thereto. For example, the physical page 371 stores data of LBA 0 to LBA 3, the physical page 372 stores data of LBA 56 to LBA 59, the physical page 373 stores data of LBA 4 to LBA 7, and so on. The physical page 377 denoted in backslashes does not store data of any host page. The physical pages 371 to 378 and the physical pages 391 to 398 may form a super physical-page 350 across storage sub-units. A physical address of each physical page may be represented in a notation (m,n) to indicate the $n^{th}$ physical page of the $m^{th}$ super physical-page. Those artisans may use a similar but different notation to represent a designated physical page of a designated super physical-page, and the invention should not be limited thereto. A host may carry a host page number in a write command to inform the apparatus 10 of which host page data to be written. The apparatus 10 may distribute data of a continuous host pages into the storage sub-units 311 to 337 for optimizing data access efficiency with the architecture as shown in FIG. 2. The host may carry a host page number in a read command to inform the apparatus 10 of which host page data to be read.

In some implementations, the apparatus 10 may maintain two sorts of mapping tables: Host-to-Flash (H2F); and Flash-to-Host (F2H), thereby enabling conversions between logical addresses and physical addresses by searching the mapping tables. The apparatus 10 may store L2P and P2L mapping tables in the memory 130. The L2P table stores information indicating which physical address (for example, a designated physical page of a designated super physical-page) user data of each logical address is physically stored in, sorted by logical addresses (for example, from lowest to highest host page numbers). The P2L table stores information indicating which logical address (for example, a designated host page number) assigned by the host user data of each physical address is associated with, sorted by physical addresses (for example, from lowest to highest physical page numbers under a designated super physical-page number).

Reflecting the case as shown in FIG. 3, an exemplary L2P mapping table is shown as follows:

TABLE 1

| Logical Address (Host Page Number) | Physical Address |
| --- | --- |
| 0 | (A, 0) |
| 1 | (A, 2) |
| 2 | (A, 4) |
| 3 | (A, 8) |
| 4 | (A. 10) |
| 5 | (A, 12) |
| 6 | (A, 14) |
| 7 | NULL |
| 8 | (A, 15) |
| 9 | (A, 13) |
| 10 | (A, 11) |
| 11 | (A, 9) |
| 12 | (A, 7) |
| 13 | (A, 5) |
| 14 | (A, 3) |
| 15 | (A, 1) |

In the physical address field, the letter "A" represents an identifier of the super physical-page 350, the string "(A,0)" indicates the $0^{th}$ physical page of the super physical-page 350 (that is, the physical page 371 of the storage sub-unit 311), the string "(A,1)" indicates the $1^{st}$ physical page of the super physical-page 350 (that is, the physical page 372 of the storage sub-unit 311), the string "(A,2)" indicates the $2^{nd}$ physical page of the super physical-page 350 (that is, the physical page 373 of the storage sub-unit 313), and so on. The string "NULL" indicates that user data of a designated host page has not been stored in the storage unit 190.

Reflecting to the case as shown in FIG. 3, an exemplary P2L mapping table is shown as follows:

TABLE 2

| Physical Address | Logical Address (Host Page Number) |
| --- | --- |
| (A, 0) | 0 |
| (A, 1) | 15 |
| (A, 2) | 1 |
| (A, 3) | 14 |
| (A, 4) | 2 |
| (A, 5) | 13 |
| (A, 6) | NULL |
| (A, 7) | 12 |
| (A, 8) | 3 |
| (A, 9) | 11 |
| (A, 10) | 4 |
| (A, 11) | 10 |
| (A, 12) | 5 |
| (A, 13) | 9 |
| (A, 14) | 6 |
| (A, 15) | 8 |

In the logical address field, each number indicates a designated host page. The string "NULL" indicates that space of a designated physical address does not store user data associated with a host page.

However, since the NAND memory cells can be used or reused only if they have been erased, the apparatus 10 finds an available physical page to store user data of a designated logical address in response to a write command for updating that of the logical address received from a host, rather than directly re-programming memory cells of a physical address storing that of the logical address. Meanwhile, the corresponding logical address information of the P2L mapping table becomes incorrect and the apparatus 10 spends extra time to update the P2L mapping table. Or, the apparatus 10 spends extra time to search other P2L mapping tables so as to check if logical address information of this P2L mapping table is valid before an acquisition of the logical address information thereof. It will be understood that accesses to the P2L mapping tables not only consumes computation resources of the processing unit 110 but also occupies certain space of the memory 130 and bandwidths of the access interface 180.

Figure 4:
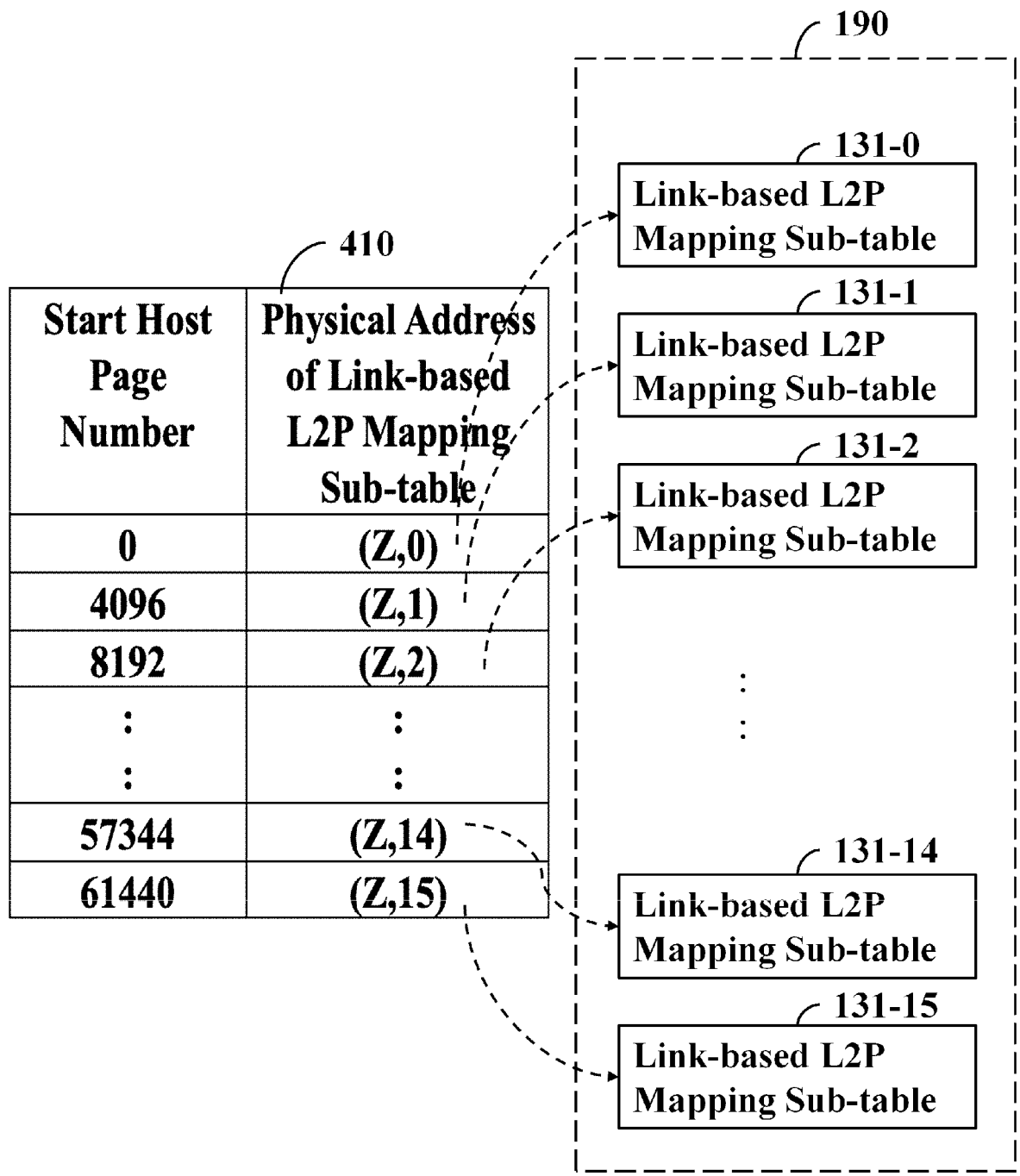
FIG. 4 is a schematic diagram illustrating a high-level mapping table associated with link-based Logical-to-Physical (L2P) mapping sub-tables according to an embodiment of the invention.

Embodiments of the invention introduce a link-based L2P mapping table storing information indicating which physical address (for example, a designated physical page of a designated super physical-page) user data of each logical address is physically stored in, and which logical address (for example, a host page number) of user data stored in the next physical address, sorted by logical addresses (for example, from lowest to highest host page numbers). Specifically, the link-based L2P mapping table contains entries and each entry stores a physical address associated with a designated logical address, and a logical address (hereinafter referred to as the next-chained logical address) associated with a physical address next to this physical address (that is, the next physical address). Refer to FIG. 4. Since the memory 130 cannot provide sufficient space to store the whole link-based L2P mapping table that can be searched by the processing unit 110, the whole link-based L2P mapping table may be divided into sub-tables 130-0 to 130-15 and the sub-tables 130-0 to 130-15 are stored in the storage unit 190. Each time a L2P or P2L address conversion is performed, the processing unit 110 reads a link-based L2P mapping sub-table corresponding to one or more logical or physical addresses from the storage unit 190 through the access interface 180 and stores the link-based L2P mapping sub-table in the memory 130, for example, the link-based L2P mapping sub-table 131-$p$ as shown in FIG. 1, where p ranges from 0 to 15. Although embodiments of the invention describe sixteen link-based L2P mapping sub-table as an example, those artisans may provide more or less link-based L2P mapping sub-tables according to capacity of the storage unit 190, and the invention should not be limited thereto. To make the processing unit 110 read a proper link-based L2P mapping sub-table 131-$p$ from the storage unit 190, embodiments of the invention may provide a high-level mapping table 410 for storing information about a physical address of a link-based L2P mapping sub-table associated with each logical address range. For example, the link-based L2P mapping sub-table 131-0 associated with the $0^{th}$ to $4095^{th}$ host pages is stored in the $0^{th}$ physical page of a designated super physical-page (being identified by the letter "Z"), the link-based L2P mapping sub-table 131-1 associated with the $4096^{th}$ to $8191^{th}$ host pages is stored in the $1^{st}$ physical page of the super physical-page, and so on.

Reflecting the case as shown in FIG. 3, an exemplary link-based L2P mapping sub-table 131-0 is shown as follows:

TABLE 3

| Logical Address (Host Page Number) | Physical Address | Next-chained Logical Address |
|---|---|---|
| 0 | (A, 0) | 15 |
| 1 | (A, 2) | 14 |
| 2 | (A. 4) | 13 |
| 3 | (A, 8) | 11 |
| 4 | (A, 10) | 10 |
| 5 | (A, 12) | 9 |
| 6 | (A, 14) | 8 |
| 7 | NULL | NULL |
| 8 | (A, 15) | NULL |
| 9 | (A, 13) | 6 |
| 10 | (A, 11) | 5 |
| 11 | (A, 9) | 4 |
| 12 | (A, 7) | 3 |
| 13 | (A, 5) | 12 |
| 14 | (A, 3) | 2 |
| 15 | (A, 1) | 1 |

To make audience comprehend easier, a host page number field is provided in Table 3. However, in actual storage, the link-based L2P mapping sub-table may exclude the field storing host page numbers. The content of the physical address field may refer to relevant descriptions of Table 1. Each physical address may be represented in four bytes, in which two bytes store information about a super physical-page and the other two bytes store information about a physical page. A next-chained logical address field stores information indicating which entry (hereinafter referred to as the next-chained logical address) the next physical address associated with each logical address stores. For example, the $1^{st}$ entry indicates that user data of the $0^{th}$ host page is stored in the physical address "(A,0)" and the next physical address "(A,1)" is stored in the entry associated with the $15^{th}$ host page. Each next-chained logical address may be represented in four bytes. In addition to the content of the L2P mapping sub-table, the link-based L2P mapping sub-table includes linkage information between physical addresses for generating an ad-hoc P2L mapping table to overcome the limitations that the content of an P2L mapping table becomes incorrect after user data of the storage unit 190 has been updated.

The content of the link-based L2P mapping sub-table 130-0 may be stored in the memory 130 in different manners to facilitate look-ups by the processing unit 110. Refer to FIG. 5. A link-based L2P mapping sub-table 131-0$a$ may store physical address information associated with the $0^{th}$ to $15^{th}$ host pages in memory addresses "S+0" to "S+63" sequentially and next-chained logical address information associated with the $0^{th}$ to $15^{th}$ host pages in memory addresses "S+64" to "S+127" sequentially to form two groups, where the letter "S" indicates a start address of the memory 130 storing the link-based L2P mapping sub-table 131-0. A link-based L2P mapping sub-table 131-0$b$ may store pairs of physical address information and next-chained logical address information associated with the $0^{th}$ to $15^{th}$ host pages in predefined memory space sequentially. For example, the physical address information and the next-chained logical address information associated with the $0^{th}$ host page are stored in the memory addresses "S+0" to "S+3" and "S+4" to "S+7", respectively, and so on.

A method for controlling data access introduced in embodiments of the invention may at least include steps for generating a link-based L2P mapping sub-table, determining which user data to be moved by using a link-based L2P mapping sub-table in background operations and updating a link-based L2P mapping sub-table in an erase process.

Figure 6:
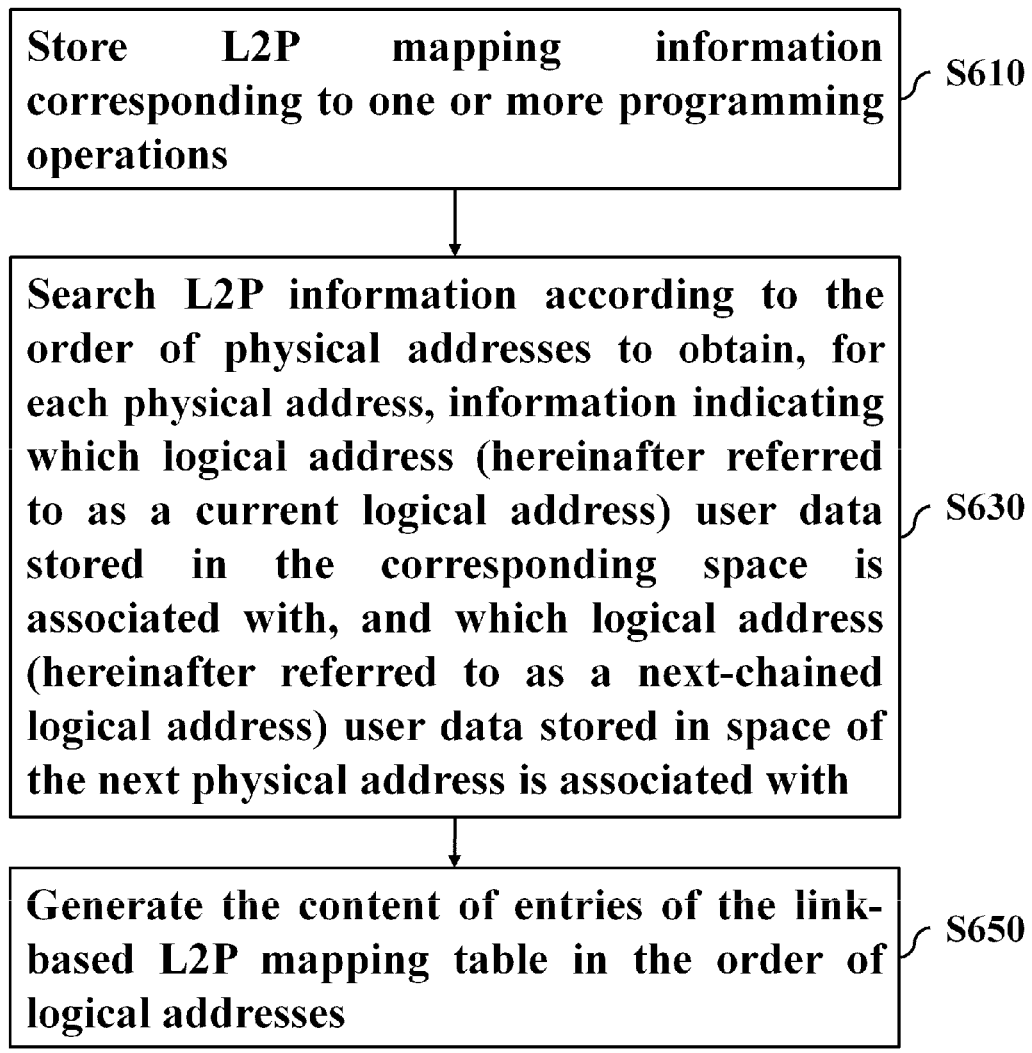
FIG. 6 is a flowchart illustrating a method for generating link-based L2P mapping sub-tables according to an embodiment of the invention.

Each time after user data of a predefined number of host pages has been written, embodiments of the invention generates a link-based L2P mapping sub-table 131-$p$ corresponding to the write operations. After a programming operation has been performed completely, the storage unit 190 may reply to the processing unit 110 with L2P mapping information indicating which physical address user data associated with each host page is physically stored in through the access interface 180. Refer to FIG. 6. Responding to execution results of programming operations by the storage unit 190, the processing unit 110 performs a method for generating a link-based L2P mapping sub-table 131-$p$ when loading and executing relevant firmware and/or software instructions. First, the processing unit 110 may receive and store L2P mapping information corresponding to one or more programming operations, which is replied by the storage unit 190 through the access interface 180, in the memory 130 (step S610). The L2P mapping information describes information indicating which physical address of the storage unit 190 user data of each logical address (e.g. each host page number) is physically stored in. The information may be realized in a L2P mapping table 133 or a L2P mapping linked-list 135. The L2P information may be searched according to the order of physical addresses, for example, from the physical addresses "(A,0)" to "(A,15)", to obtain, for each physical address, information indicating which logical address (hereinafter referred to as the current logical address) user data stored in the corresponding space is associated with, and which logical address (hereinafter referred to as the next-chained logical address) user data stored in space of the next physical address is associated with (step S630). The content of entries of the link-based L2P mapping table 131-$p$ may be generated in the order of logical addresses and each entry stores a physical address and a next-chained logical address associated with the corresponding logical address (step S650). For example, the $0^{th}$ entry stores a physical address corresponding to the $0^{th}$ host page, and a host page number associated with a physical address next to the corresponding physical address. Specifically, an entry of the link-based L2P mapping sub-table 131-*p* that is to be written is determined according to the current logical address corresponding to each physical address, this physical address is stored in the physical address field of the determined entry and the next-chained logical address corresponding to this physical address is stored in the next-chained logical address field of the determined entry, so as to complete the link-based L2P mapping sub-table 131-*p* as shown in Table 3. At a proper moment, the link-based L2P mapping sub-table 131-*p* may be flushed into one or more designated physical addresses of the storage unit 190 for a future look-up.

Figure 7:
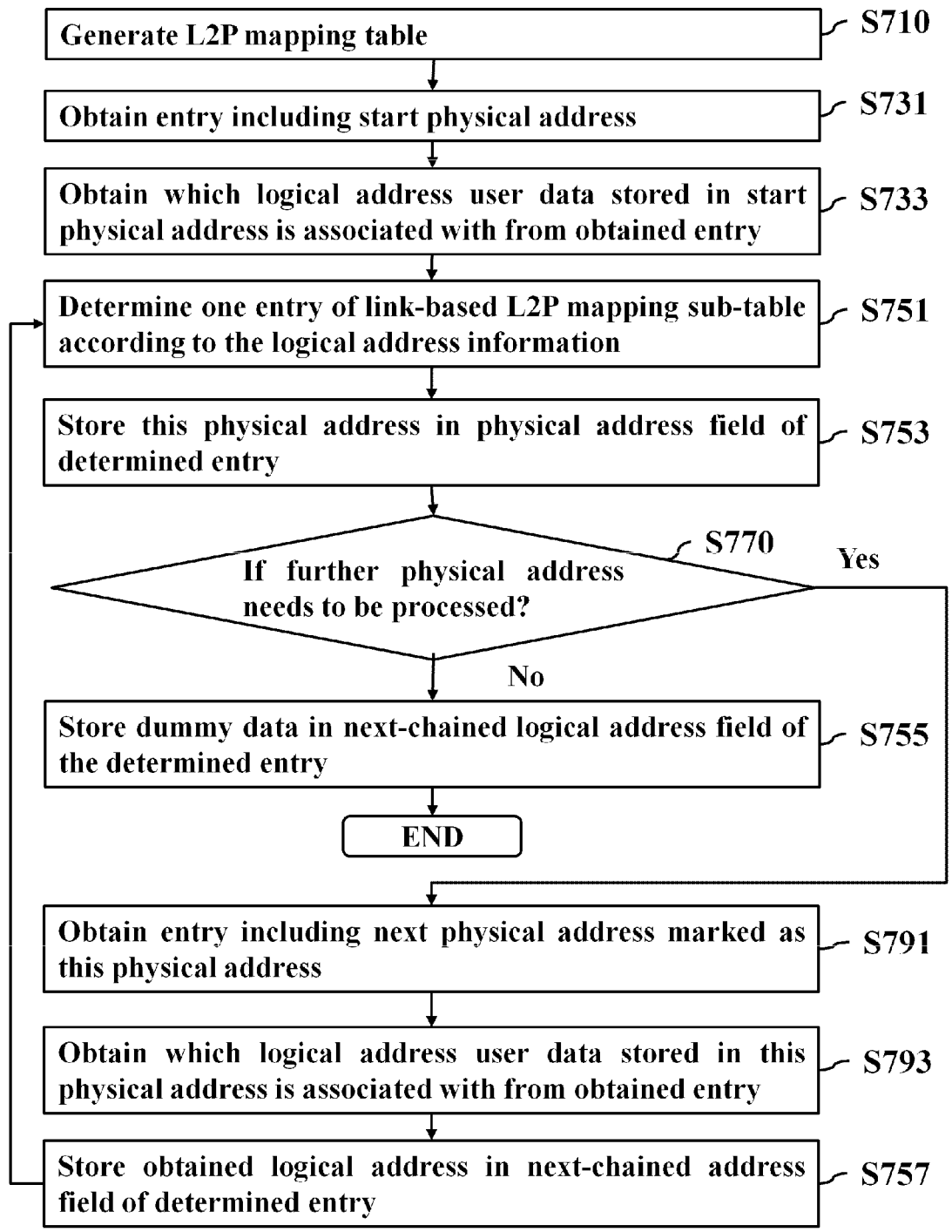
FIG. 7 is a flowchart illustrating a method for generating link-based L2P mapping sub-tables using information of a L2P mapping table according to an embodiment of the invention.

FIG. 7 describes a detailed process for generating the link-based L2P mapping sub-table. The processing unit 110 performs a method for generating a link-based L2P mapping sub-table 131-*p* by traversing the L2P mapping table 133 when loading and executing relevant firmware and/or software instructions. The processing unit 110 may fill all fields with dummy values "NULL" when the link-based L2P mapping sub-table 131-*p* is initiated. First, the processing unit 110 may generate and store the L2P mapping table 133 in the memory 130 in response to execution results of programming operations by the storage unit 190 (step S710). It is to be understood that the L2P mapping 133 may be used to accelerate a generation of the link-based L2P mapping sub-table 131-*p* and is temporarily stored in the memory 130. After the link-based L2P mapping sub-table is generated, the L2P mapping table 133 may be removed from the memory 130. Use cases are introduced with references made to Table 1 to explain process flows as shown in FIG. 7. Assume that a start physical address is "(A,0)": The L2P mapping table 133 is searched by the processing unit 110 to obtain an entry including the start physical address marked as this physical address (for example, the $0^{th}$ entry of Table 1), where the start physical address (step S731); information about which logical address (for example, the host page number "0") user data stored in space of this physical address is associated with is obtained from the searched entry (step S733); one of the entries of the link-based L2P mapping sub-table 131-*p* (for example, the $0^{th}$ entry of Table 3) is determined according to the logical address information (step S751); the start physical address "(A,0)" is stored in the physical address field of the determined entry (step S753); the L2P mapping table 133 is searched to obtain an entry including the next physical address "(A,1)" marked as this physical address (for example, the $15^{th}$ entry of Table 1) (step S791); information about which logical address (for example, the host page number "15") user data stored in space of the next physical address "(A,1)" from the obtained entry (step S793); and the obtained next host page number "15" is stored in the next-chained logical address field of the determined entry (for example, the $0^{th}$ entry of Table 3) (step S757).

Next, sequentially for the following physical addresses, for example, "(A,1)", "(A,2)", "(A3)" "(A,4)", "(A5)" "(A7)" "(A,8)", "(A9)" "(A,10)" "(A,11)" "(A,12)", "(A,13)", "(A,14)" and "(A,15)", the content of other entries of the link-based L2P mapping sub-table 131-*p* is generated. For example, the L2P mapping table 133 is searched by the processing unit 110 to obtain an entry including the physical address "(A,1)" marked as this physical address (for example, the $15^{th}$ entry of Table 1) (step S791); information about which logical address (for example, the host page number "15") user data stored in space of this physical address is associated with is obtained from the searched entry (step S793); one of the entries of the link-based L2P mapping sub-table 131-*p* (for example, the $15^{th}$ entry of Table 3) is determined according to the logical address information (step S751); the physical address "(A,1)" is stored in the physical address field of the determined entry (step S753); the L2P mapping table 133 is searched to obtain an entry including the next physical address "(A,2)" marked as this physical address (for example, the $1^{st}$ entry of Table 1) (step S791); information about which logical address (for example, the host page number "1") user data stored in space of the next physical address "(A,2)" from the obtained entry (step S793); and the obtained next host page number "1" is stored in the next-chained logical address field of the determined entry (for example, the 1st entry of Table 3) (step S757). The generation of other entries of the link-based L2P mapping sub-table 131-*p*, which correspond to the physical addresses "(A,2)" to "(A,14)", may be deduced by analogy.

Finally, for the physical address "(A,15)", the L2P mapping table 133 is searched by the processing unit 110 to obtain an entry including this physical address (for example, the $8^{th}$ entry of Table 1) (step S791); information about which logical address (for example, the host page number "8") user data stored in space of this physical address is associated with is obtained from the searched entry (step S793); one of the entries of the link-based L2P mapping sub-table 131-*p* (for example, the $8^{th}$ entry of Table 3) is determined according to the logical address information (step S751); the physical address "(A,15)" is stored in the physical address field of the determined entry (step S753); and the dummy value "NULL" is stored in the next-chained logical address field of the determined entry (for example, the $8^{rd}$ entry of Table 3) to indicate that no user data has been stored in a following physical address (step S755). It is to be understood that a variable may be used and stored in the memory 130 to indicate a physical address being marked as this physical address.

Figure 8:
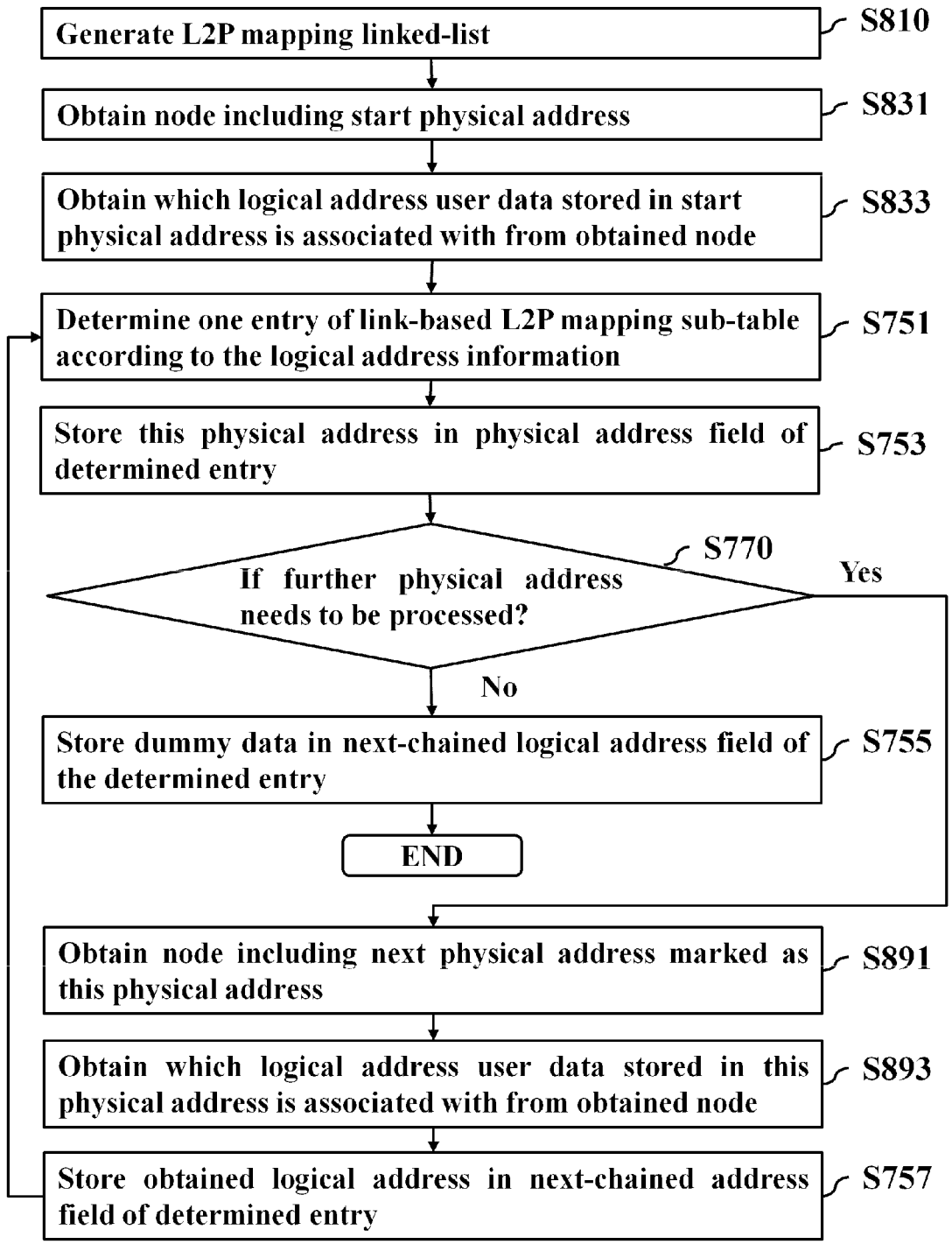
FIG. 8 is a flowchart illustrating a method for generating link-based L2P mapping sub-tables with a utilization of a linked-list search engine according to an embodiment of the invention.

Since the searches on the L2P mapping table consume computation resources of the processing unit 110, embodiments of the invention introduce another method for generating the link-based L2P mapping table 131-*p*, in which obtains relevant information by using a dedicated linked-list search engine 150 capable of searching the content of a L2P mapping linked-list 135. FIG. 8 describes a detailed process for generating the link-based L2P mapping sub-table. The method for generating the link-based L2P mapping sub-table 131-*p* by the processing unit 110 when loading and executing relevant firmware and/or software instructions, together with the linked-list search engine 150. It is to be understood that the processing unit 110 may fill content of all fields with dummy values "NULL" when the link-based L2P mapping sub-table 131-*p* is initiated. Most steps of FIG. 8 are similar with that of FIG. 7. Some steps of FIG. 7 are modified to use the linked-list search engine 150 for accelerating searches on L2P information. The modified steps are described in the following passages and the similar steps are omitted for brevity. First, in response to execution results of programming operations by the storage unit 190, the processing unit 110 may generate and store the L2P mapping linked-list 135 in the memory 130 (step S810).

Figure 9:
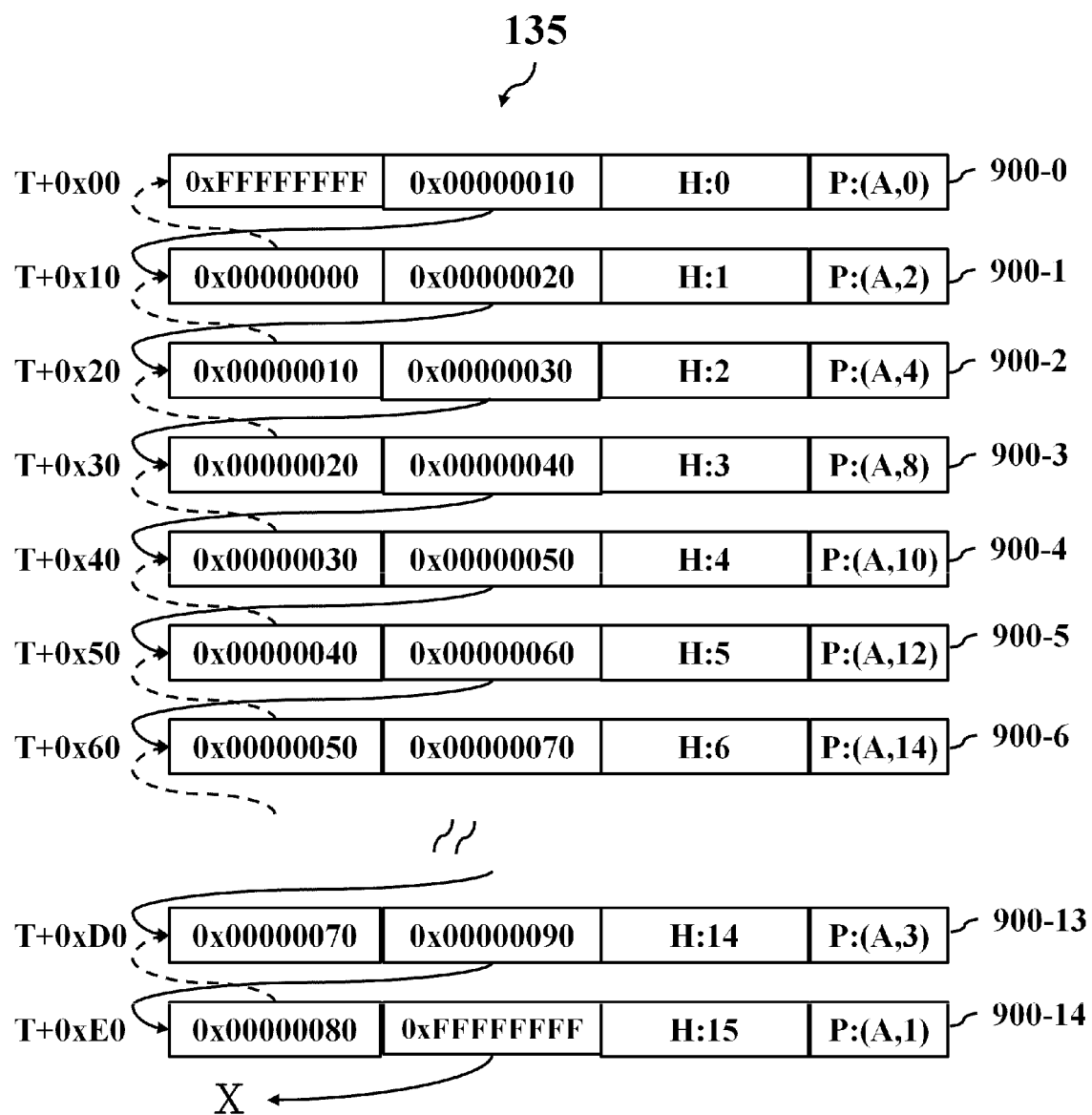
FIG. 9 is a schematic diagram of a L2P mapping linked-list according to an embodiment of the invention.

Refer to FIG. 9. The L2P mapping linked-list 135 may include fifteen nodes 900-0 to 900-14 and each node may store data in long words (i.e. sixteen bytes). Within each node, bytes 0 to 3 store a memory address pointing to its backward node (also referred to as the backward-node address), bytes 4 to 7 store a memory address pointing to its forward node (also referred to as the forward-node address), bytes 8 to 11 store information about a logical address (may be denoted as "H:p", where p indicates a host page number)

and bytes 12 to 15 store information about the corresponding physical address (may be denoted as "P(m,n)", where m indicates a super physical-page number and n indicates a physical page number). The backward-node address may store dummy data (NULL value, e.g. "0xFFFFFFFF") to indicate that this node is the first node of the linked list. The forward-node address may store dummy data to indicate that this node is the last node of the linked list. For example, the nodes 900-0 and 900-14 are the first and last nodes of the linked list, respectively. The start address of the node 900-0 is "T+0x00", the start address of the node 900-1 is "T+0x10", and the rest can be deduced by analogy, where the letter "T" indicates a start address of the memory 130 storing the L2P mapping linked-list 135. The forward-node address of the node 900-0 points to the memory address "0x10" (i.e. the start address of the node 900-1), the forward-node address of the node 900-1 points to the memory address "0x20" (i.e. the start address of the node 900-2) and the rest can be deduced by analogy. The host page number and the corresponding physical address of the node 900-0 are "0" and "(A,0)" respectively, the host page number and the corresponding physical address of the node 900-1 are "1" and "(A,2)" respectively, and the rest can be deduced by analogy. It is to be understood that the L2P mapping linked-list 135 may be used to accelerate a generation of the link-based L2P mapping sub-table 131-*p* and is temporarily stored in the memory 130. After the link-based L2P mapping sub-table is generated, the L2P mapping linked-list 135 may be removed from the memory 130.

Refer to FIG. 1. The linked-list search engine 150 is dedicate hardware, coupled to the memory 130, for searching the content of the L2P mapping linked-list 135 until a success or fail, and accordingly generating a searched result. The searched result may be stored in an allocated region of the memory 130 or dedicate registers (not shown in FIG. 1). Moreover, for searching of a wide range of linked lists, the linked-list search engine 150 is equipped with a configuration register 170 for storing information about a data structure of each node of the L2P mapping linked-list 135, a memory address of a start node thereof to be searched, a search direction, and a value to be searched. The allocation register 170 may be integrated into the linked-list search engine 150 as part of circuitry, and the invention should not be limited thereto. The processing unit 110 coupled to the configuration register 170 may inform the linked-list search engine 150 how to search the content of the L2P mapping linked-list 135 by setting the configuration register 170, After the content of the L2P mapping linked-list 135 has been prepared in the memory 130, the processing unit 110 drives the linked-list search engine 150 to start a search on the L2P mapping linked-list 135 and obtains a searched result from the linked-list search engine 150.

Figure 10:
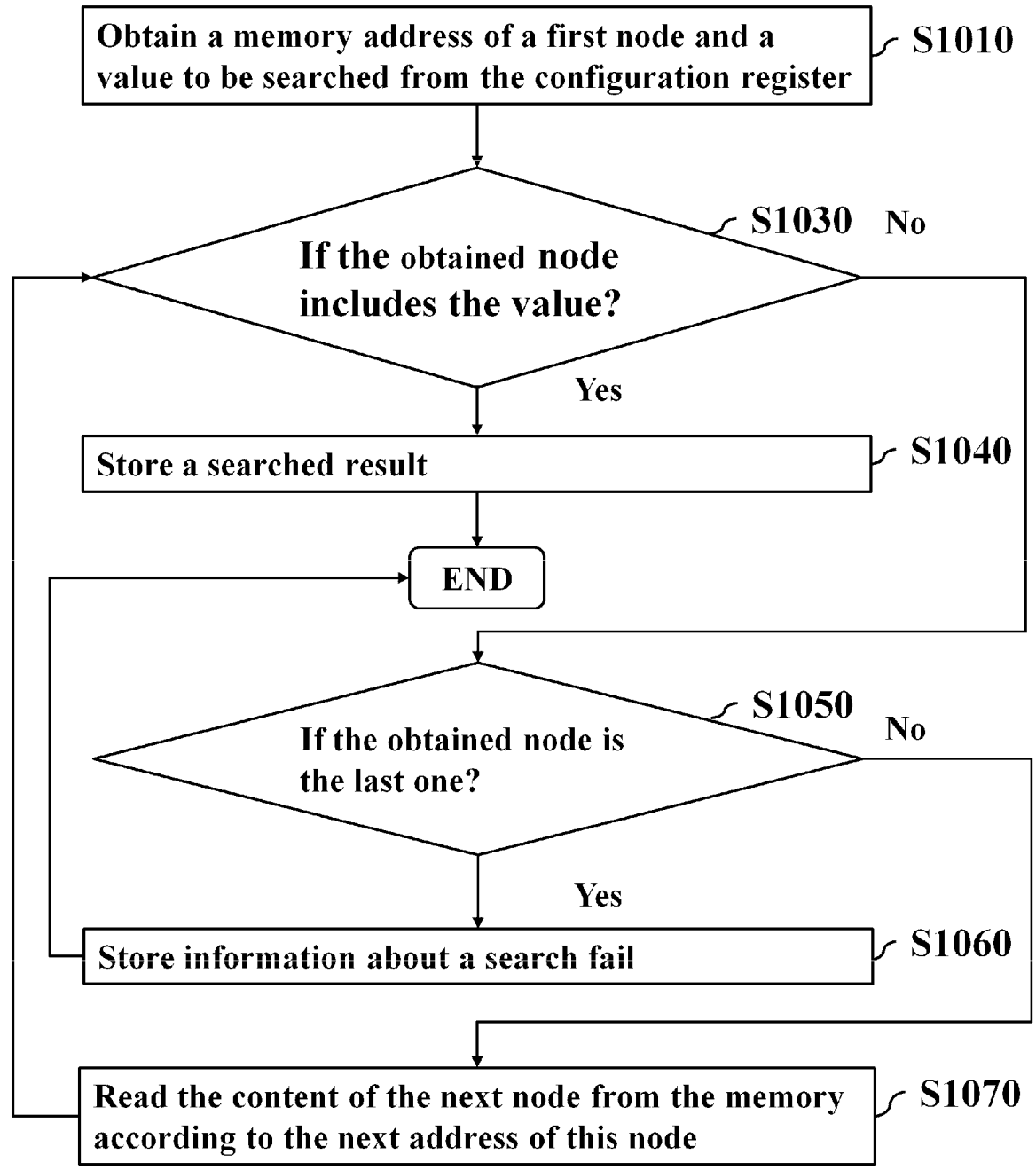
FIG. 10 is a flowchart illustrating a method for searching a L2P mapping linked-list according to an embodiment of the invention.

A method for searching linked lists as shown in FIG. 10 is performed by the linked-list search engine 150. The linked-list search engine 150 obtains a memory address of the head node (also referred to as a start node) and a value to be searched from the configuration register 170, and obtains the content of the start node according to the memory address (step S1010). Next, the linked-list search engine 150 repeatedly executes a loop (steps S1030, S1050 and S1070) for obtaining and processing the nodes of the L2P mapping linked-list 135 from the start node sequentially until a success (the "Yes" path of step S1030) or a fail (the "Yes" path of step S1050). After obtaining the first or the next node from the memory 130 (step S1010 or S1070) in each iteration, it is determined whether the obtained node includes the value to be searched for the processing unit 110 (step S1030). If a search on a node is successful (the "Yes" path of step S1030), then the linked-list search engine 150 stores a searched result, for example, including a memory address of the found node, corresponding outcomes, a quantity of nodes have been searched, and so on, and information about a search success, enabling the processing unit 110 to obtain that (step S1040). If a search on a node is failed (the "No" path of step S1030), it is determined whether the node is the last one of the L2P mapping linked-list 135 (step S1050). If the last node has been reached (the "Yes" path of step S1050), then the linked-list search engine 150 stores information about a search fail to enable the processing unit 110 to obtain that (step S1060). If the last node hasn't been reached (the "No" path of step S1050), then the linked-list search engine 150 reads the content of the next node from the memory 130 according to the next address of this node (step S1070). The content of each node and search details with different hardware circuits will be described in the following passages. Those artisans may modify FIG. 10 to make a search on the L2P mapping linked-list 135 from the tail node (also referred to as a start node) to the prior ones sequentially until a success or fail.

Figure 11:
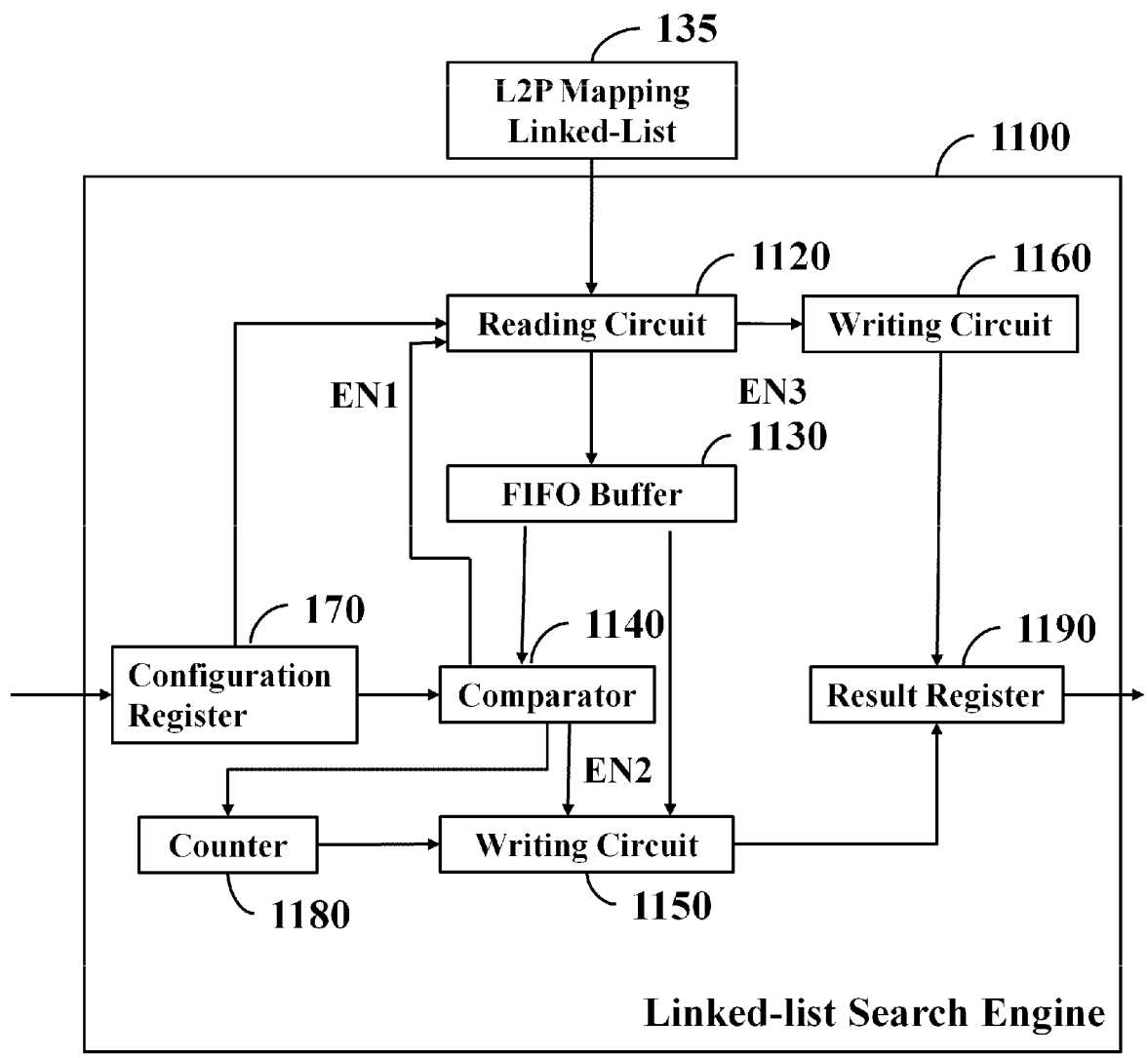
FIGS. 11 to 13 are block diagrams illustrating linked-list search engines according to embodiments of the invention.

Refer to FIG. 11. The linked-list search engine 500 may include a configuration register 170, a reading circuit 1120, a First-In-First-Out (FIFO) buffer 1130, a comparator 1140, writing circuits 1150 and 1160, and a result register 1190. The processing unit 110 may set the configuration register 170 to store a start address of the first node, data-structure information of each node (such as offsets of the backward-node address, the forward-node address, comparison data, a corresponding result, etc.), a search value and a search direction. Once the processing unit 110 enables the linked-list search engine 1100, the reading circuit 1120 may read the forward- or backward-node address, the comparison data and the corresponding result of the first node from the L2P mapping linked-list 135 according to the content of the configuration register 170 and output the comparison data and the corresponding result to the FIFO buffer 1130. In addition, the reading circuit 1120 may output the start address of the first node to the FIFO buffer 1130. The comparator 1140 compares the search value of the configuration register 170 with the comparison data of the FIFO buffer 1130. When they are different, the comparator 1140 may output an enabling signal EN1 to the reading circuit 1120 for driving the reading circuit 1120 to read the content of the next node from the linked list 131. The reading circuit 520 may determine whether any node has not been processed, for example, whether the forward- or backward-node address is not dummy data. If so, then the reading circuit 520 may read the aforementioned values from the forward- or backward node of the L2P mapping linked-list 135 according to the forward- or backward-node address as well as the mentioned content and output all or a part of the values to the FIFO buffer 1130. If not, then the reading circuit 1120 may output an enabling signal EN3 to the writing circuit 1160 for driving the writing circuit 1160 to store information about a search fail in the result register 1190. When the search value of the configuration register 170 is the same as the comparison data of the FIFO buffer 1130, the comparator 1140 may output an enabling signal EN2 to the writing circuit 1150 for driving the writing circuit 1150 to store the corresponding result and the start address of the currently searched node (i.e. the matched node) that are stored in the FIFO buffer 1130, and information about a search success in the result register 1190. For example, bytes 0 to 3 of the result register 1190 store the corresponding result, bytes 4 to 7 thereof store the start address of the currently searched node and a byte 8 stores information about a search success or fail. When a search is successful, the byte 8 is set to "1"; otherwise, set to "0".

For optimizing the arrangement for the nodes of the L2P mapping linked-list 135, in some embodiments, the linked-list search engine 500 may include a counter 1180 coupled to the comparator 1140 and the writing circuit 1150, that is initiated to zero each time a new search starts. Each time a comparison of the search value of the configuration register 170 with the comparison data of the FIFO buffer 1130 is performed, the comparator 1140 forces the counter 1180 to increment by one. When determining that the search value of the configuration register 170 is the same as the comparison data of the FIFO buffer 1130, the comparator 1140 drives the writing circuit 1150 to store the value of the counter 1180 in the result register 1190. For example, a byte 9 of the result register 1190 stores the counter value.

The comparison data of each node may be compound data, for example, including at least two sorts of data. In some embodiments, the processing unit 110 may set the configuration register 170 to indicate that four bytes are used for storing a mask. The comparator 1140 may perform a logic AND operation on the comparison data of the FIFO buffer 1130 with the mask of the configuration register 170 to generate masked comparison data and subsequently determine whether the search value of the configuration register 170 is the same as the masked comparison data. If so, then the comparator 1140 may drive the writing circuit 1150 to store the corresponding result and the start address of the currently searched node, that are stored in the FIFO buffer 1130, and information about a search success in the result register 1190. For example, the former two bytes of the host page number indicates a specific number of a T1 table and the latter two bytes thereof indicates a specific number of a T7 table. When the search value of the configuration register 170 is a specific number of the T1 table, the processing unit 110 may store a mask "0xFFFF0000" in the configuration register 170, whereby enabling the comparator 540 to ignore the latter two bytes of the host page number (i.e. a specific number of the T7 table). When the search value of the configuration register 170 is a specific number of the T7 table, the processing unit 110 may store a mask "0x0000FFFF" in the configuration register 170, whereby enabling the comparator 1140 to ignore the former two bytes of the host page number (i.e. a specific number of the T1 table).

The comparison data of each node may include a bit that is not required to compare, for example, the most significant bit. In some embodiments, the processing unit 110 may set the configuration register 170 to use one byte for storing information about an ignore bit, for example, "0x1F" represents that the bit 31 of the comparison data can be ignored. The comparator 1140 may generate a mask according to information of the ignored bit, perform a logic AND operation on the comparison data of the FIFO buffer 1130 with this mask and determine whether the search value of the configuration register 170 is the same as the masked comparison data. If so, then the comparator 1140 drives the writing circuit 1150 to store the corresponding result and the start address of the currently searched node, that are stored in the FIFO buffer 1130, and information about a search success in the result register 1190. For example, the ignore bit is bit 31, the mask is "0x7FFFFFFF".

Figure 12:
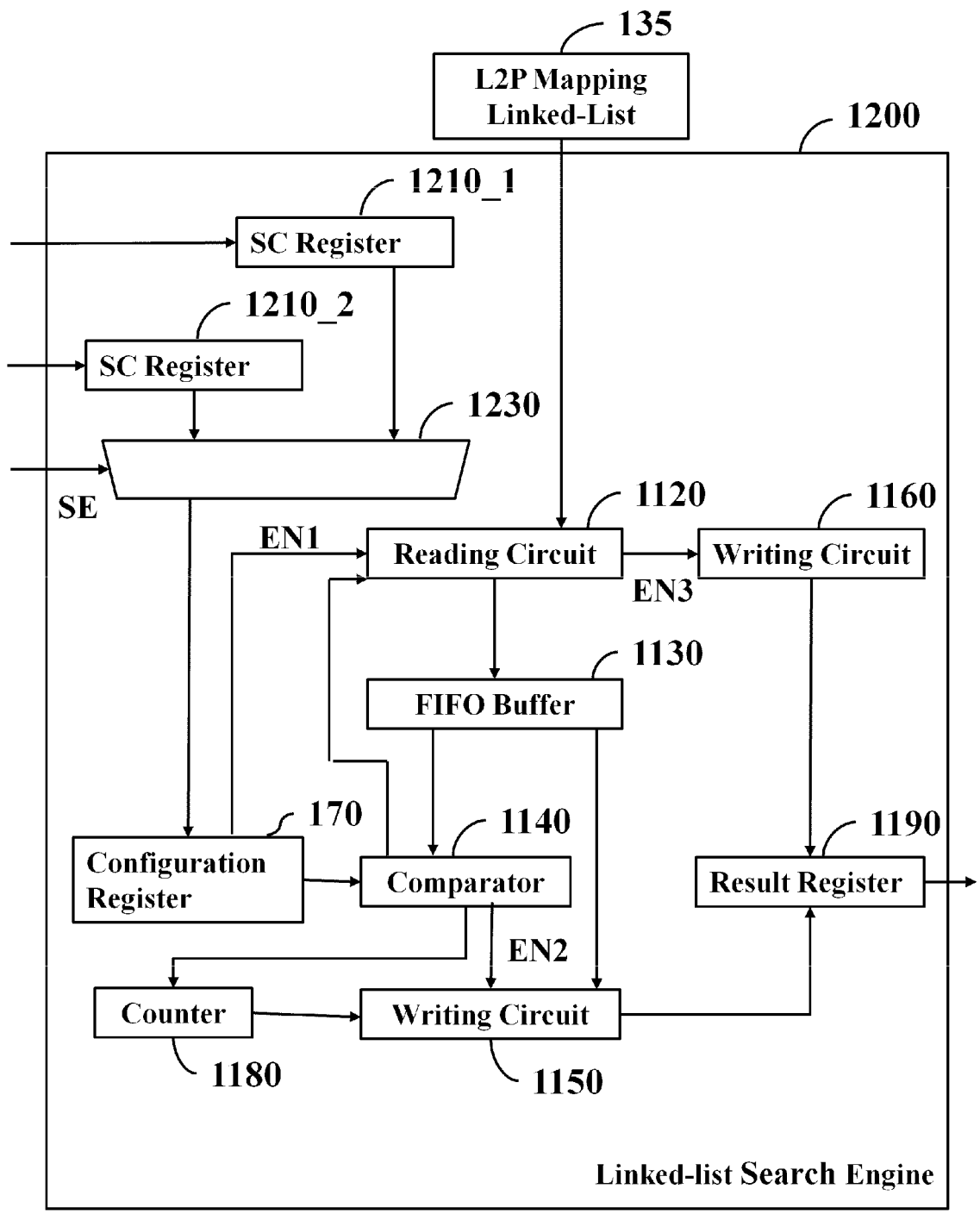

Refer to FIG. 12. Since firmware may have two sets of configuration settings or more, that are frequently used, the linked-list search engine 600 may include shortcut (SC) registers 1210_1 and 1210_2, making the processing unit 110 to store two sets of configuration settings in the SC registers 1210_1 and 1210_2 in advance, respectively. Each set may include information about a memory address of a start node of the L2P mapping linked-list 135, a search direction, a search value, and data structure for each node. Each set may additionally include information about the aforementioned mask and/or ignore bit. The linked list search engine 1200 may further include a multiplexer 1230 having inputs coupled to outputs of the SC registers 1210_1 and 1210_2, and an output coupled to an input of the configuration register 170. The processing unit 110 may output a select signal SE to the multiplexer 1230 to couple one of the SC registers 1210_1 and 1210_2 to the configuration register 170, making the configuration register 170 to store the configuration settings of the coupled SC register. Although the embodiments illustrated in FIG. 12 include two SC registers, those artisans may modify the linked-list search engine 1200 to incorporate with more SC registers and the invention should not be limited thereto. The references of detailed structures, functionalities and operations for the remaining elements of FIG. 12 may be made to the relevant descriptions of FIG. 11 and are omitted for brevity.

Figure 13:
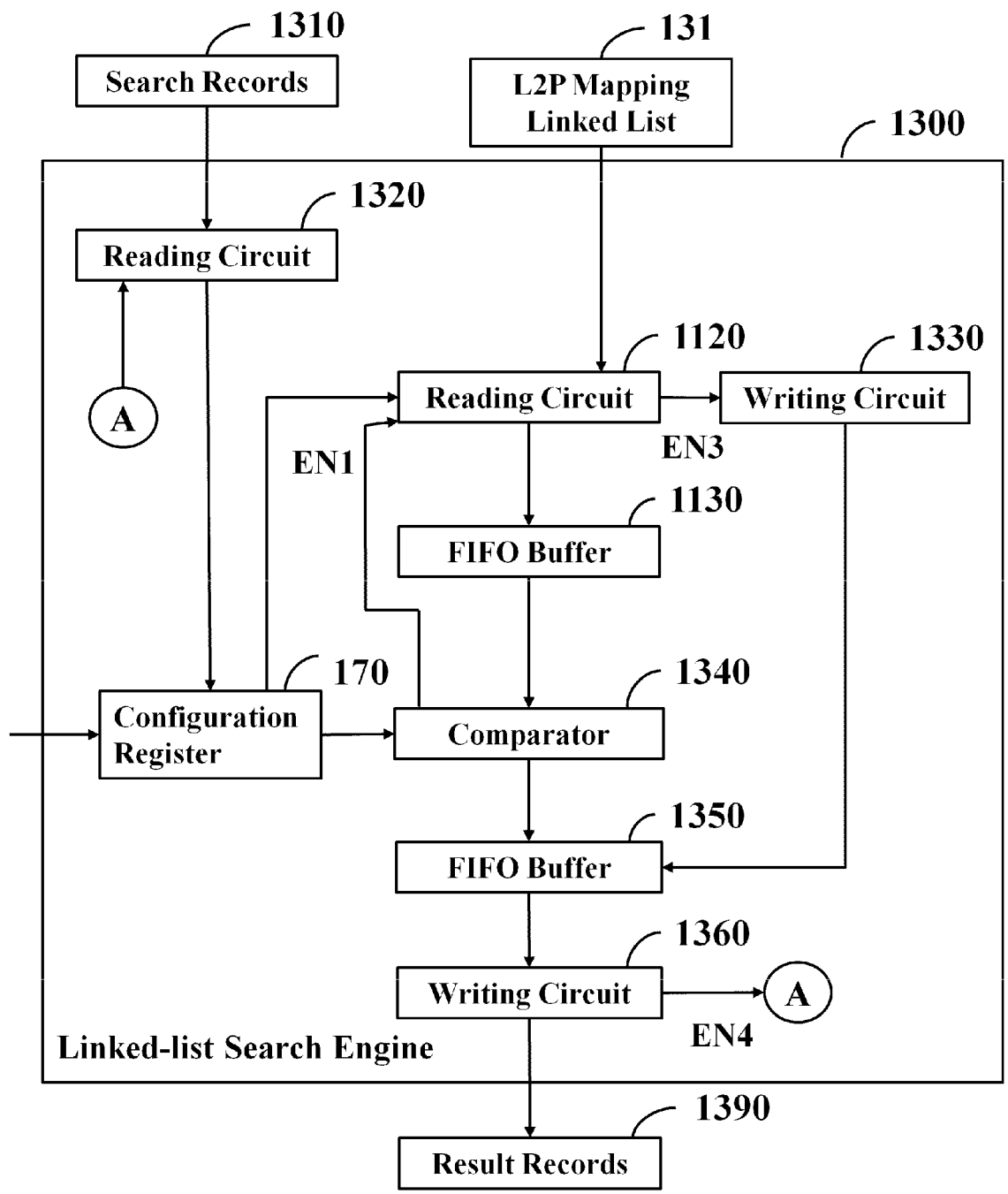

Refer to FIG. 13. To improve efficiency of parallelism, the linked-list search engine 1300 may provide capabilities for conducting multiple searches. The processing unit 110 is allowed to provide several search values at one time, enabling the processing unit 110 to arrange searches on the L2P mapping linked-list 135 and other tasks more flexible to improve the overall system performance. The processing unit 110 may allocate a fixed region for storing multiple search records 1310. The processing unit 110 may further allocate a fixed region for storing multiple result records that can be updated by the linked-list search engine 1300. Each search record 1310 may include a search value and a start flag used to inform the linked-list search engine 1300 whether a search on the L2P mapping linked-list 135 has been triggered. Each result record 1390 is associated with one search record 1310 and may include a finish flag, a result flag, searched times and a memory address of the searched node. The finish flag is used to inform the processing unit 110 whether a search for the corresponding search value has completed. The result flat is used to inform the processing unit 110 whether the corresponding search value has been found in the L2P mapping linked-list 135. The search records 1310 and the result records 1390 may be integrated with keys for easier access.

A reading circuit 1320 may inspect whether a record including a start flag being "1" (indicating that a search has been triggered) and a finish flag being "0" (indicating that the search has not completed) is presented. Once detecting that any record has met the criteria, the reading circuit 1320 stores the search value of this record in the configuration register 170. The references of detailed operations of the reading circuit 1120 may be made to the relevant descriptions of FIG. 11 and are omitted for brevity. When determining that no node can be searched, the reading circuit 1120 may output an enabling signal EN3 to the writing circuit 1330 for driving the writing circuit 1330 to store the search value and information about a search fail in a FIFO buffer 1350. The writing circuit 1330 may further store a quantity of nodes of the L2P mapping linked-list 135 in the FIFO buffer 1350 as searched times. When determining that the search value of the configuration register 170 is the same as the comparison data of the FIFO buffer 1130, a comparator 1340 may store the corresponding result and the start address of the currently searched node, that are stored in the FIFO buffer 1130, and information about a search success in a FIFO buffer 1350. The comparator 1340 may further include a counter that is initiated to zero before a new search. The counter is increased by one each time the comparator 1340 conducts a comparison of the search value of the configuration register 170 with the comparison data of the FIFO buffer 1130. When determining that the search value of the configuration register 170 is the same as the comparison data of the FIFO buffer 1130, the comparator 1340 may further store the counter value in the FIFO buffer 1350 as searched times. When the data is entered in the FIFO buffer 1350, the writing circuit 1360 may write the content of the FIFO buffer 1350 into the corresponding result record 1390 and output an enabling signal EN4 to the reading circuit 1320 to advise the reading circuit 1320 to read the next search record 1310.

Refer to FIG. 8. After storing the L2P mapping linked-list 135 (step S810), the processing unit 110 enables the linked-list search engine 150 to search the L2P mapping linked-list 135 and obtains a node including a start physical address according to a searched result provided by the linked-list search engine 150 (step S831), and next, obtains information about which logical address user data stored in space of the start physical address is associated with from the searched node (step S833). Each time a further physical address needs to be searched after a search for one physical address has completed (the "Yes" path of step S770), the processing unit 110 enables the linked-list search engine 150 to search the L2P mapping linked-list 135 and obtains a node including the next physical address according to a searched result provided by the linked-list search engine 150 (step S891), and next, obtains information about which logical address user data stored in space of the next physical address is associated with from the searched node (step S893). Since the rest steps of FIG. 8 are similar with that of FIG. 7, detailed operations may refer to relevant descriptions of FIG. 7 and are omitted for brevity.

In some embodiments, the processing unit 110 may process tasks in parallel of a search on the L2P mapping linked-list 135 by the linked-list search engine 150. After a predefined time period, the processing unit 110 may attempt to obtain a searched result by traversing the memory 130 or dedicated registers. When no result has been stored in the memory 130 or the dedicated registers, the processing unit 110 may continue to process unfinished tasks until the next time period has elapsed. In alternative embodiments, after completing a search, the linked-list search engine 150 may issue a signal (e.g. an interrupt) to enable the processing unit 110 to obtain a searched result. In still alternative embodiments, after completing a search, the linked-list search engine 150 may set a status register (not shown in FIG. 1) to inform the processing unit 110 of information about a searched result. The processing unit 110 may periodically traverse the status register. Once the status register has been set, the processing unit 110 obtains a searched result. With the coordination of the processing unit 110 with the linked list search engine 150, a search on the L2P mapping linked-list 135 can be performed in parallel of other tasks to improve the overall performance. That is, the processing unit 110 can execute other tasks parallelly during the linked-list search engine 150 searches the content of the L2P mapping linked-list 135.

Figure 14:
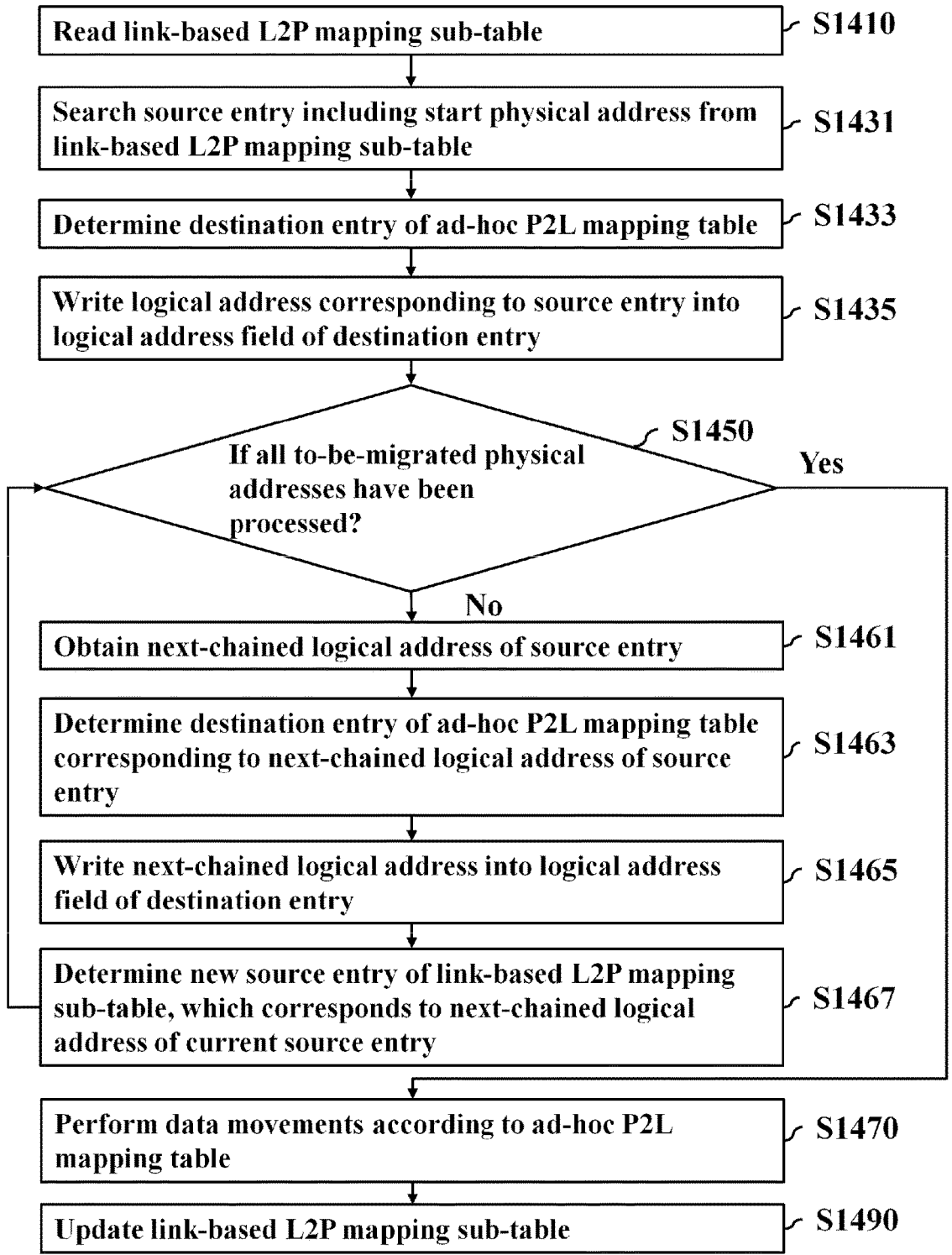
FIG. 14 is a flowchart illustrating a method for performing background operations according to an embodiment of the invention.

The processing unit 110 may perform background operations that are not activated by a host (not shown in FIG. 1) at arbitrary moments. The background operations of data accesses, such as for a garbage collection (GC) process, a wear leveling process, a read reclaim process or a read reflash process, may be activated by the apparatus 10 for actively improving the storage performance of the storage unit 190. In other words, executions of the background operations are irrelevant from the host (not shown in FIG. 1). In the background operations, the processing unit 110 may move user data of physical pages, such as the physical addresses "(A,0)" to "(A,15)" to new physical pages. Refer to FIG. 14. The processing unit 110 performs a method for executing background operations when loading and executing relevant firmware and/or software instructions. The processing unit 110 reads a link-based L2P mapping sub-table 131-$p$ corresponding to the physical pages to be migrated from the storage unit 190 and stores the sub-table 131-$p$ in the memory 130 (step S1410), generates a P2L mapping table describing which logical address user data stored in space of each physical address is associated with according to the content of the link-based L2P mapping sub-table 131-$p$ (steps S1431 to S1450), performs data movements of the background operations with references made to the content of the ad-hoc P2L mapping table (step S1470), and updates the link-based L2P mapping sub-table 131-$p$ according to results of the data movements and programs the updated sub-table 131-$p$ into a designated address of the storage unit 190 (step S1490). It is to be understood that the P2L mapping table may accelerate the executions of the background operations and is temporarily stored in the memory 130. After the background operations are performed completely, the P2L mapping table may be removed from the memory 130.

Assume that user data of physical addresses "(A,0)" to "(A,15)" is decided to be moved: Details for generating an ad-hoc P2L mapping table are described below together with examples as shown in Table 3. It is to be understood that the processing unit 110 may fill the content of all fields with dummy values "NULL" when an ad-hoc P2L mapping table is initiated. For the start physical address "(A,0)", the processing unit 110 searches a source entry including the start physical address from the link-based L2P mapping sub-table (for example, the $0^{th}$ entry of Table 3) (step S1431); determines a destination entry of the ad-hoc P2L mapping table (for example, the $0^{th}$ entry of Table 2) that corresponds to the start physical address (step S1433); and writes a logical address (for example, the host page number "0") corresponding to the source entry into the logical address field of the destination entry (step S1435).

Next, the content of the rest entries of the ad-hoc P2L mapping table is generated for the subsequent physical addresses in sequence, such as "(A,1)", "(A,2)", "(A,3)", "(A,4)", "(A,5)", "(A,7)", "(A,8)", "(A,9)", "(A,10)", "(A,11)", "(A,12)", "(A,13)", "(A,14)" and "(A,15)". For example, for the physical address next to "(A,0)", the processing unit 110 obtains the next-chained logical address of the source entry of the link-based L2P mapping sub-table (for example, the host page number "15" of the $0^{th}$ entry of Table 3) (step S1461); determines a destination entry of the ad-hoc P2L mapping table (for example, the $1^{st}$ entry of Table 2) that corresponds to the physical address (for example, "(A,1)") of the entry (for example, the $15^{th}$ entry of Table 3) corresponding to the next-chained logical address (for example, the host page number "15") of the source entry (for example, the $0^{th}$ entry of Table 3) (step S1463); writes the next-chained logical address into the logical address field of the destination entry of the ad-hoc P2L mapping table (step S1465); and determines a new source entry of the link-based L2P mapping sub-table (for example, the $2^{nd}$ entry of Table 3) for the next iteration, which corresponds to the next-chained logical address of the current source entry (for example, the $15^{th}$ entry of Table 3)

(step S1467). Details for generating the content of the other entries corresponding to the physical addresses "(A,2)" to "(A,15)" may be deduced by analogy. The final result of the ad-hoc P2L mapping table may refer to the content of Table 2.

In step S1470, the processing unit 110 may issue multiple read commands including physical addresses to the storage unit 190 through the access interface 180 according to the content of the ad-hoc P2L mapping table for reading user data associated with logical addresses from the physical addresses indicated in Table 2. The processing unit 110 may issue multiple write commands including logical addresses (for example, host page numbers) to the storage unit 190 through the access interface 180 for programming the user data associated with the logical addresses into new physical addresses. It is to be understood that the storage unit 190 replies to the processing unit 110 through the access interface 180 with information indicating which physical address the user data of each logical address is physically stored in after the write commands are executed successfully.

In step S1490, the processing unit 110 may perform the method as shown as any of FIGS. 6 to 8 for updating the link-based L2P mapping sub-table according to execution results of programming operations performed by the storage unit 190. An exemplary link-based L2P mapping sub-table 131-0 after being updated is shown as follows:

TABLE 4

| Logical Address (Host Page Number) | Physical Address | Next-chained Logical Address |
|---|---|---|
| 0 | (B, 0) | 1 |
| 1 | (B, 1) | 2 |
| 2 | (B, 2) | 3 |
| 3 | (B, 3) | 4 |
| 4 | (B. 4) | 5 |
| 5 | (B, 5) | 6 |
| 6 | (B, 6) | 8 |
| 7 | NULL | NULL |
| 8 | (B, 7) | 9 |
| 9 | (B, 8) | 10 |
| 10 | (B, 9) | 11 |
| 11 | (B, 10) | 12 |
| 12 | (B, 11) | 13 |
| 13 | (B, 12) | 14 |
| 14 | (B, 13) | 15 |
| 15 | (B, 14) | NULL |

The host (no shown in FIG. 1) may issue an erase command to the processing unit 110 and the processing unit 110 accordingly instructs the apparatus 10 to erase user data of particular host pages. After the storage unit 190 completes the erase operations, the link-based L2P mapping sub-table 131-$p$ is accordingly updated. In some embodiments, the processing unit 110 may update the content of the next-chained logical address field of the link-based L2P mapping sub-table 131-$p$ for jumping the host pages that have been erased. However, it may consume excessive computation resources to traverse entries of the link-based L2P mapping sub-table 131-$p$. Reflecting the erase operations, the link-based L2P mapping sub-table 131-$p$ included in the embodiments of the invention may be modified to append an erase flag field to indicate whether user data corresponding to each logical address (for example, a host page number) has been erased. The link-based L2P mapping sub-table 131-0 of Table 3 may be devised as follows:

TABLE 5

| Logical Address (Host Page Number) | Physical Address | Next-chained Logical Address | Erase Flag |
|---|---|---|---|
| 0 | (A, 0) | 15 | F |
| 1 | (A, 2) | 14 | F |
| 2 | (A, 4) | 13 | F |
| 3 | (A, 8) | 11 | F |
| 4 | (A. 10) | 10 | F |
| 5 | (A, 12) | 9 | F |
| 6 | (A, 14) | 8 | F |
| 7 | NULL | NULL | NULL |
| 8 | (A, 15) | NULL | F |
| 9 | (A, 13) | 6 | F |
| 10 | (A, 11) | 5 | F |
| 11 | (A, 9) | 4 | F |
| 12 | (A, 7) | 3 | F |
| 13 | (A, 5) | 12 | F |
| 14 | (A, 3) | 2 | F |
| 15 | (A, 1) | 1 | F |

An erase flag may be represented by one bit. An erase flag may be set to logical false "F" when user data of a corresponding host page is valid. For example, the processing unit 110 may update erase flags corresponding to the $1^{st}$ to $5^{th}$ host pages of the link-based L2P mapping sub-table 131-0 with logical trues "T" when the storage unit 190 completes erase operations on user data of host page numbers "1" to "5", such that the erased host pages can be omitted from being considered in future loop-ups. The updated results may be shown as follows:

TABLE 6

| Logical Address (Host Page Number) | Physical Address | Next-chained Logical Address | Erase Flag |
|---|---|---|---|
| 0 | (A, 0) | 15 | F |
| 1 | (A, 2) | 14 | T |
| 2 | (A, 4) | 13 | T |
| 3 | (A, 8) | 11 | T |
| 4 | (A. 10) | 10 | T |
| 5 | (A, 12) | 9 | T |
| 6 | (A, 14) | 8 | F |
| 7 | NULL | NULL | NULL |
| 8 | (A, 15) | NULL | F |
| 9 | (A, 13) | 6 | F |
| 10 | (A, 11) | 5 | F |
| 11 | (A, 9) | 4 | F |
| 12 | (A, 7) | 3 | F |
| 13 | (A, 5) | 12 | F |
| 14 | (A, 3) | 2 | F |
| 15 | (A, 1) | 1 | F |

Since the erase flags are appended to the link-based L2P mapping sub-table 131-$p$, step S1435 of FIG. 14 may be devised to write the logical address corresponding to the source entry into the logical address field of the destination entry when the erase flag of the source entry is the logical false "F". In addition, step S1465 of FIG. 14 may be devised to write the obtained next-chained logical address into the logical address field of the destination entry when the erase flag of the source entry is the logical false "F". Reflecting the exemplary link-based L2P mapping sub-table 131-0 as shown in Table 6, the generated ad-hos P2L mapping table is shown as follows:

TABLE 7

| Physical Address | Logical Address (Host Page Number) |
|---|---|
| (A, 0) | 0 |
| (A, 1) | 15 |
| (A, 2) | NULL |
| (A, 3) | 14 |
| (A, 4) | NULL |
| (A, 5) | 13 |
| (A, 6) | NULL |
| (A, 7) | 12 |
| (A, 8) | NULL |
| (A, 9) | 11 |
| (A, 10) | NULL |
| (A, 11) | 10 |
| (A, 12) | NULL |
| (A, 13) | 9 |
| (A, 14) | 6 |
| (A, 15) | 8 |

Some or all of the aforementioned embodiments of the method of the invention may be implemented in a computer program such as an operating system for a computer, a driver for a dedicated hardware of a computer, or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

The computer program may be advantageously stored on computation equipment, such as a computer, a notebook computer, a tablet PC, a mobile phone, a digital camera, a consumer electronic equipment, or others, such that the user of the computation equipment benefits from the aforementioned embodiments of methods implemented by the computer program when running on the computation equipment. Such the computation equipment may be connected to peripheral devices for registering user actions such as a computer mouse, a keyboard, a touch-sensitive screen or pad and so on.

Although the embodiment has been described as having specific elements in FIGS. 1, 2 and 11-13, it should be noted that additional elements may be included to achieve better performance without departing from the spirit of the invention. Each element of FIGS. 1, 2 and 11-13 is composed of various circuits and arranged to operably perform the aforementioned operations. While the process flows described in FIGS. 6-8, 10 and 14 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for controlling data access, comprising:
a memory;
an access interface coupled to a storage unit; and
a processing unit coupled to the memory and the access interface, and arranged to operably receive logical-to-physical (L2P) mapping information corresponding to a programming operation through the access interface and store the L2P mapping information in the memory, wherein the L2P mapping information describes information indicating which physical address of the storage unit that user-data of each logical address is physically stored in; search the L2P mapping information to obtain a first logical address associated with user-data that is stored in space of each first physical address, and a second logical address associated with user-data that is stored in space of a second physical address next to each first physical address; generate content of a plurality of entries of a link-based L2P mapping sub-table in the order of logical addresses, wherein each entry of the link-based L2P mapping sub-table stores information about the corresponding first physical address and the corresponding second logical address associated with a one first logical address; and store the link-based L2P mapping sub-table.

2. The apparatus of claim 1, wherein the L2P mapping information is organized in a L2P mapping table comprising a plurality of entries sorted by logical addresses and each entry of the L2P mapping table stores information indicating which physical address that user-data of a corresponding logical address is physically stored in.

3. The apparatus of claim 1, wherein the L2P mapping information is organized in a L2P mapping linked-list comprising a plurality of nodes sorted by logical addresses, and each node of the L2P mapping linked-list stores information indicating which physical address that user-data of a corresponding logical address is physically stored in, and a memory address pointing to the next node.

4. The apparatus of claim 3, comprising:
a linked-list search engine coupled to the processing unit, wherein the processing unit is arranged to operably drive the linked-list search engine to search the L2P mapping linked-list for obtaining the first logical address and the second logical address corresponding each physical address.

5. The apparatus of claim 4, wherein the processing unit is arranged to operably process a task in parallel of a search on the L2P mapping linked-list.

6. The apparatus of claim 1, wherein the processing unit is arranged to operably determine an entry of the link-based L2P mapping sub-table that is to be written according to the first logical address corresponding to each physical address; and write the physical address, and the second logical address corresponding to the physical address into the determined entry.

7. The apparatus of claim 1, wherein the processing unit is arranged to operably read the link-based L2P mapping sub-table; generate a Physical-to-Logical (P2L) mapping table according to the link-based L2P mapping sub-table, wherein the P2L mapping table describes which logical address that user-data is stored in space of each physical address is associated with; perform a data movement of a background operation according to content of the P2L mapping table; and update the link-based L2P mapping sub-table according to a result of the data movement.

8. The apparatus of claim 7, wherein an execution of the background operation is irrelevant from a host and the data movement is performed to move user data of a physical page to a new physical page.

9. The apparatus of claim 7, wherein, during the data movement, the processing unit is arranged to operably issue a read command including a physical address to the storage unit through the access interface for reading user data associated with a logical address from the physical address indicated in the P2L mapping table; and issue a write command including the logical address to the storage unit through the access interface for programming the user data associated with the logical address into a new physical address.

10. The apparatus of claim 1, wherein each entry of the link-based L2P mapping sub-table comprises an erase flag indicating whether user data of a logical address has been erased, and the processing unit is arranged to operably update the erase flag of an entry to indicate that user data of a corresponding logical address has been erased after completing an erase operation for the corresponding logical address.

11. A method for controlling data access, performed by a processing unit, comprising:
receiving logical-to-physical (L2P) mapping information corresponding to a programming operation through an access interface, and storing the L2P mapping information in the memory, wherein the L2P mapping information describes information indicating which physical address of a storage unit that user-data of each logical address is physically stored in;
searching the L2P mapping information to obtain a first logical address associated with user-data that is stored in space of each first physical address, and a second logical address associated with user-data that is stored in space of a second physical address next to each first physical address;
generating content of a plurality of entries of a link-based L2P mapping sub-table in the order of logical addresses, wherein each entry of the link-based L2P mapping sub-table stores information about the corresponding first physical address and the corresponding second logical address associated with each first logical address; and
storing the link-based L2P mapping sub-table.

12. A non-transitory computer program product for controlling data access when executed by a processing unit, the non-transitory computer program product comprising program code to:
receive logical-to-physical (L2P) mapping information corresponding to a programming operation through an access interface and store the L2P mapping information in the memory, wherein the L2P mapping information describes information indicating which physical address of a storage unit that user-data of each logical address is physically stored in;
search the L2P mapping information to obtain a first logical address associated with user-data that is stored in space of each physical address, and a second logical address associated with user-data that is stored in space of a second physical address next to each first physical address;
generate content of a plurality of entries of a link-based L2P mapping sub-table in the order of logical addresses, wherein each entry of the link-based L2P mapping sub-table stores information about the corresponding first physical address and the corresponding second logical address associated with one first logical address; and
store the link-based L2P mapping sub-table.

13. The non-transitory computer program product of claim 12, wherein the L2P mapping information is organized in a L2P mapping table comprising a plurality of entries sorted by logical addresses and each entry of the L2P mapping table stores information indicating which physical address that user-data of a corresponding logical address is physically stored in.

14. The non-transitory computer program product of claim 12, wherein the L2P mapping information is organized in a L2P mapping linked-list comprising a plurality of nodes sorted by logical addresses, and each node of the L2P mapping linked-list stores information indicating which physical address that user-data of a corresponding logical address is physically stored in, and a memory address pointing to the next node.

15. The non-transitory computer program product of claim 14, comprising program code to:
drive a linked-list search engine to search the L2P mapping linked-list for obtaining the first logical address and the second logical address corresponding each physical address.

16. The non-transitory computer program product of claim 12, comprising program code to:
determine an entry of the link-based L2P mapping sub-table that is to be written according to the first logical address corresponding to each physical address; and
write the physical address, and the second logical address corresponding to the physical address into the determined entry.

17. The non-transitory computer program product of claim 12, comprising program code to:
read the link-based L2P mapping sub-table;
generate a Physical-to-Logical (P2L) mapping table according to the link-based L2P mapping sub-table, wherein the P2L mapping table describes which logical address that user-data is stored in space of each physical address is associated with;
perform a data movement of a background operation according to content of the P2L mapping table; and
update the link-based L2P mapping sub-table according to a result of the data movement.

18. The non-transitory computer program product of claim 17, wherein an execution of the background operation is irrelevant from a host and the data movement is performed to move user data of a physical page to a new physical page.

19. The non-transitory computer program product of claim 17, comprising program code to:
issue, during the data movement, a read command including a physical address to the storage unit through the access interface for reading user data associated with a logical address from the physical address indicated in the P2L mapping table; and
issue, during the data movement, a write command including the logical address to the storage unit through the access interface for programming the user data associated with the logical address into a new physical address.

20. The non-transitory computer program product of claim 17, wherein each entry of the link-based L2P mapping sub-table comprises an erase flag indicating whether user data of a logical address has been erased, the non-transitory computer program product comprising program code to:

update the erase flag of an entry to indicate that user data of a corresponding logical address has been erased after completing an erase operation for the corresponding logical address.

* * * * *